(12) United States Patent
Yamawaki et al.

(10) Patent No.: US 9,983,619 B2
(45) Date of Patent: May 29, 2018

(54) IMAGE DISPLAY APPARATUS

(71) Applicant: FUJITSU TEN LIMITED, Kobe-shi, Hyogo (JP)

(72) Inventors: Atsushi Yamawaki, Kobe (JP); Junji Ito, Kobe (JP); Shogo Tanaka, Kobe (JP); Shinya Tanaka, Kobe (JP); Naoki Sugamoto, Kobe (JP); Takahiro Nishimura, Kobe (JP); Motoya Jiyama, Kobe (JP); Shinsuke Matsumoto, Kobe (JP); Shinichi Sato, Kobe (JP); Atsushi Ohtaki, Kobe (JP); Tomoyuki Kato, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 46 days.

(21) Appl. No.: 15/118,693

(22) PCT Filed: Feb. 3, 2015

(86) PCT No.: PCT/JP2015/053013
§ 371 (c)(1),
(2) Date: Aug. 12, 2016

(87) PCT Pub. No.: WO2015/129409
PCT Pub. Date: Sep. 3, 2015

(65) Prior Publication Data
US 2017/0052562 A1 Feb. 23, 2017

(30) Foreign Application Priority Data

Feb. 28, 2014 (JP) .................................. 2014-038397
Dec. 8, 2014 (JP) .................................. 2014-248406

(51) Int. Cl.
*G06F 1/16* (2006.01)
*G06F 3/041* (2006.01)
(Continued)

(52) U.S. Cl.
CPC ............ *G06F 1/1603* (2013.01); *B60K 35/00* (2013.01); *B60K 37/00* (2013.01); *G02F 1/00* (2013.01);
(Continued)

(58) Field of Classification Search
None
See application file for complete search history.

(56) References Cited

U.S. PATENT DOCUMENTS

2003/0162312 A1* 8/2003 Takayama ......... H01L 21/76251
438/22
2007/0263140 A1* 11/2007 Hinata .............. G02F 1/133308
349/96

(Continued)

FOREIGN PATENT DOCUMENTS

JP  2004-252676 A  9/2004
JP  2008-262326 A  10/2008
(Continued)

OTHER PUBLICATIONS

Apr. 21, 2015 Written Opinion issued in International Patent Application No. PCT/JP2015/053013.
(Continued)

*Primary Examiner* — Christopher Kohlman
(74) *Attorney, Agent, or Firm* — Oliff PLC

(57) ABSTRACT

An image display apparatus according to embodiments includes a display that includes a planar display surface on which an image is displayed, a cover member that includes a curved operation surface being a target for a touch operation, and a touch sensor that detecting the touch operation with respect to the operation surface. Between the cover member and the display, a clear resin body is arranged that is a transmission body that fills a space between the cover member and the display so that the space is not hollow.

7 Claims, 29 Drawing Sheets

(51) Int. Cl.
*B60K 37/00* (2006.01)
*G02F 1/00* (2006.01)
*G02F 1/1333* (2006.01)
*G02F 1/1335* (2006.01)
*B60K 35/00* (2006.01)

(52) U.S. Cl.
CPC ........ *G02F 1/1333* (2013.01); *G02F 1/13338* (2013.01); *G02F 1/133308* (2013.01); *G02F 1/133526* (2013.01); *G02F 1/133536* (2013.01); *G06F 1/1601* (2013.01); *G06F 3/041* (2013.01); *G06F 3/0412* (2013.01); *G06F 3/0416* (2013.01); *B60K 2350/1028* (2013.01); *B60K 2350/2086* (2013.01); *G02F 2001/133331* (2013.01); *G02F 2001/133531* (2013.01)

(56) References Cited

U.S. PATENT DOCUMENTS

| | | | |
|---|---|---|---|
| 2011/0261296 A1* | 10/2011 | Park | G02F 1/133502 349/96 |
| 2014/0097412 A1* | 4/2014 | Kuo | G02B 5/30 257/40 |
| 2015/0125680 A1* | 5/2015 | Araki | G03F 7/30 428/216 |
| 2015/0145804 A1* | 5/2015 | Ma | G06F 3/044 345/174 |
| 2015/0211707 A1* | 7/2015 | Watanabe | G02F 1/133308 345/667 |

FOREIGN PATENT DOCUMENTS

| | | |
|---|---|---|
| JP | 2011-123406 A | 6/2011 |
| JP | 2014-026384 A | 2/2014 |

OTHER PUBLICATIONS

Apr. 21, 2015 International Search Report issued in International Patent Application No. PCT/JP2015/053013.

Kurosawa et al., "With Restriction of Technical Element of Osamu and Electrostatic Capacitance Method Touch Panel, Trend of New Technology," Touch-Panel Front Line, Nikkei BP, 1st Edition, p. 44-59, 2010.

Jun. 27, 2017 Office Action issued in Japanese Patent Application No. 2014-038397.

* cited by examiner

IMAGE DISPLAY APPARATUS

CROSS-REFERENCE TO RELATED APPLICATIONS

This application is national stage application of :International Application No. PCT/JP2015/053013, filed on Feb. 3, 2015, which designates the United States, incorporated herein by reference, and which claims the benefit of priority from Japanese Patent Application No. 2014-038397, filed On Feb. 28, 2014 and Japanese Patent Application No. 2014-248406, filed on Dec. 8, 2014, the entire contents of which are incorporated herein by reference.

FIELD

The embodiment relates to an image display apparatus.

BACKGROUND

Conventionally, there is known an image display apparatus that has a touch panel function of accepting a touch operation of a user. In the image display apparatus, an operation surface as a target for the touch operation is arranged to overlap with a display surface on which images are displayed. By performing the touch operation with respect to a position on the operation surface that overlaps with an image such as a command button displayed on the display surface, the user can instruct the image display apparatus to perform various instructions.

The image display apparatus is used in a vehicle such as an automobile. In the vehicle, the image display apparatus is placed on a center console or the like that is located between a driving seat and a front passenger seat in the interior of the vehicle with the operation surface being exposed toward the user.

Literatures that disclose technology related to the technology described in this description include Japanese Laid-open Patent Publication No. 2004-252676.

CITATION LIST

Patent Literature

SUMMARY

Technical Problem

However, shaping the operation surface of the image display apparatus into a curved surface is studied in recent years from the viewpoint of aesthetic appearance or the like. Because it is usually difficult to adopt, as a component, a display whose display surface is a curved surface, a display whose display surface is a planar surface is adopted even when the operation surface is shaped into a curved surface.

In this case, when the curved operation surface and the planar display surface are simply overlapped with each other, an interval between the operation surface and the display surface becomes ununiform, thereby leading to a part in which the interval is large. In such a part, depending on a direction of visual recognition of the user, a large misalignment is caused between a position on the display surface at which an image of a command button or the like is actually displayed and a position on the operation surface at which the image appears. As a result, because the misalignment between the display position of the image and the touch position of the touch operation by the user becomes large, the user may not be able to instruct the image display apparatus to perform desired instructions precisely.

Solution to Problem

An image display apparatus that accepts a touch operation includes a display, a cover member, a transmission body, and a touch sensor. The display includes a planar display surface on which an image is displayed. The cover member includes a curved first principal surface that is arranged to overlap with the display surface of the display and further is a target for the touch operation. The transmission body fills a space between the cover member and the display so that the space is not hollow. The touch sensor is arranged between the cover member and the display, and detects the touch operation with respect to the first principal surface of the cover member.

DESCRIPTION OF EMBODIMENTS

Hereinafter, embodiments of the present invention will be described in detail with reference to the accompanying drawings.

1. First Embodiment 1-1. Summary of Image Display Apparatus

Figure 1:
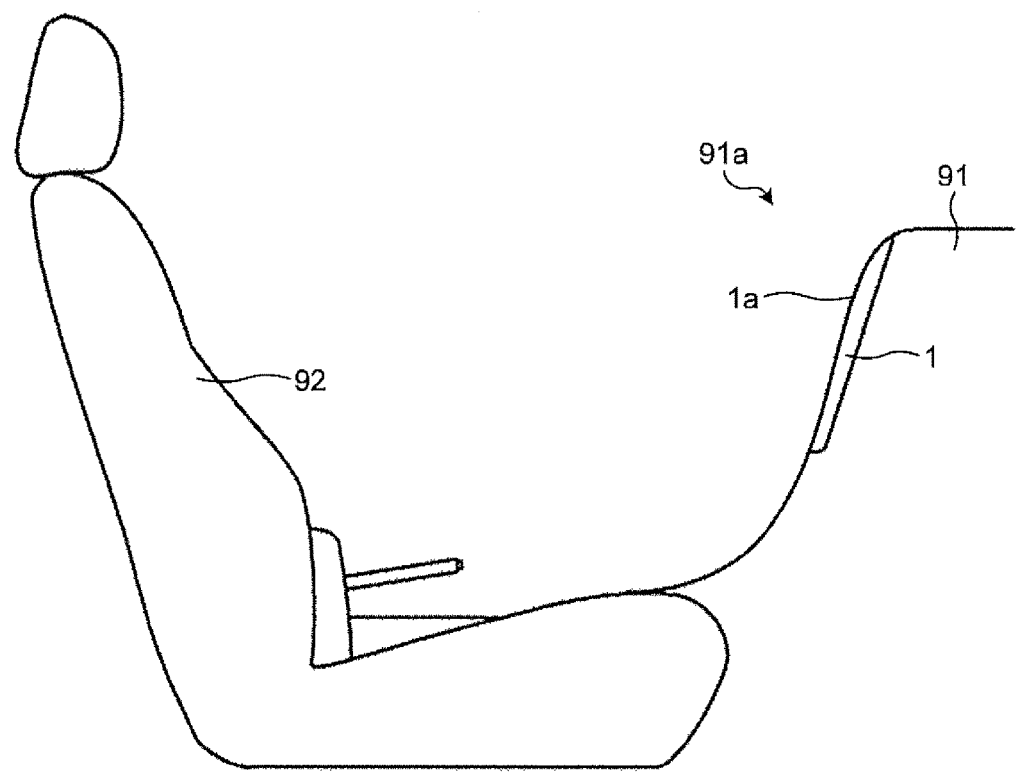
FIG. 1 is a schematic view illustrating an image display apparatus according to an embodiment.

FIG. 1 is a schematic view illustrating an image display apparatus 1 according to the present embodiment. The image display apparatus 1 is an on-vehicle apparatus that is mounted on a vehicle such as an automobile and is used in the interior of the vehicle. The image display apparatus 1 displays various images, for example, such as guidance images that guide a route leading to a destination, which are available to a user (mainly, a driver of the vehicle). Also, the image display apparatus 1 has a touch panel function of accepting a touch operation by the user, and thus the user can instruct the image display apparatus 1 to perform various instructions by performing the touch operation.

FIG. 1 illustrates an appearance of the interior of the vehicle on which the image display apparatus 1 is mounted, and the right side of the drawing corresponds to the front side of the vehicle. As illustrated in FIG. 1, the image display apparatus 1 is attached to a center console 91 that is a part of the interior of the vehicle in a state where an operation surface 1a that is a target for the touch operation is exposed to the outside.

From the viewpoint of aesthetic appearance or the like, a panel surface 91a of the center console 91 that faces the user is smoothly curved as a whole. An outermost surface acting as the operation surface 1a of the image display apparatus 1 has a curved shape in which the outermost surface is continuous with a crooked surface to which the image display apparatus 1 is attached in the interior of the vehicle. In other words, the operation surface 1a of the image display apparatus 1 is curved so as to be a part of the panel surface 91a. The image display apparatus 1 is attached to the center console 91 so as to get rid of a step between the operation surface 1a and its surrounding portions.

In general, the center console 91 is arranged between a driving seat and a front passenger seat. The user uses the image display apparatus 1 that is attached to the center console 91 in a state where the user sits on a seat 92 (driving seat or front passenger seat) of the vehicle. Therefore, the user ordinarily visually recognizes the operation surface 1a from the position that is displaced in the left/right direction from the front of the operation surface 1a.

1-2. Basic Configuration of Image Display Apparatus

Figure 2:
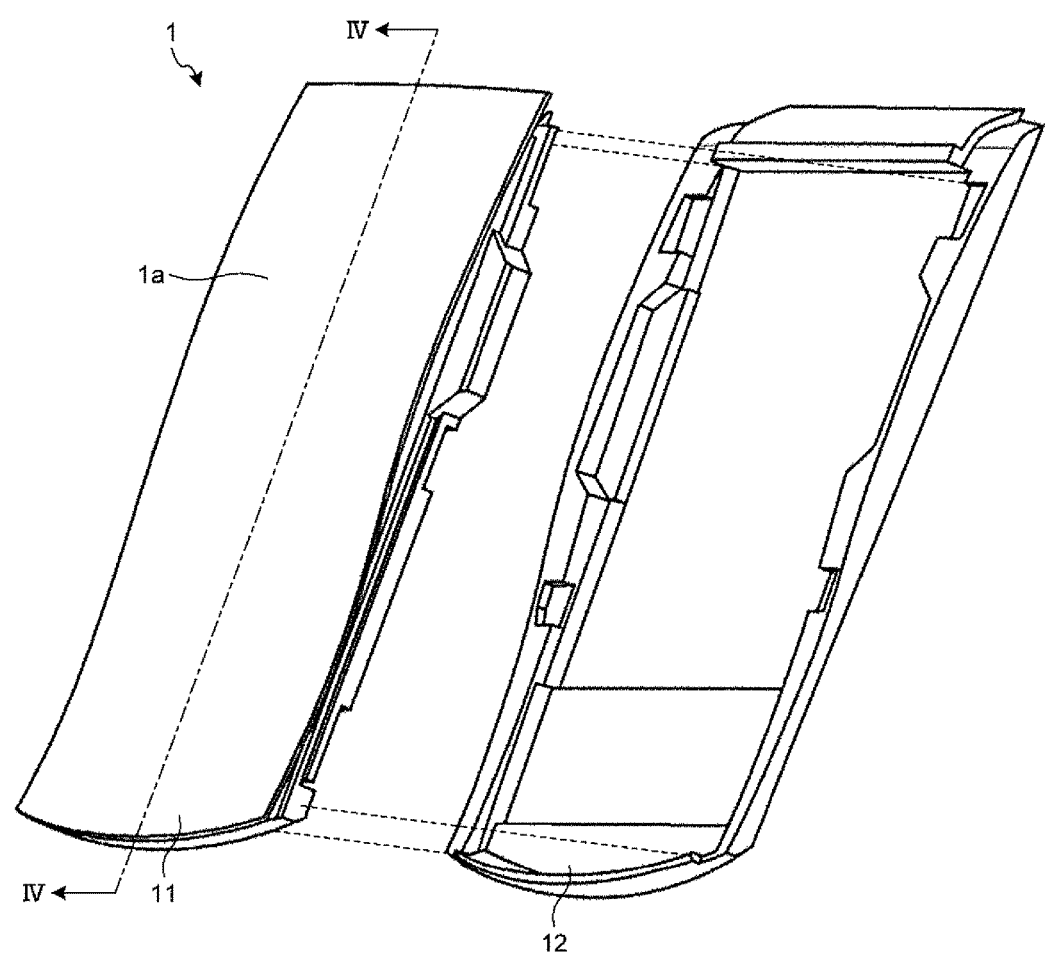
FIG. 2 is an exploded perspective view illustrating a configuration of the image display apparatus.

Next, the basic configuration of the image display apparatus 1 will be explained. FIG. 2 is an exploded perspective view illustrating a configuration of the image display apparatus 1. As illustrated in FIG. 2, the image display apparatus 1 mainly includes a display module 11 and a housing 12.

The display module 11 is an electronic component that displays various images and further accepts the touch operation of the user with respect to the operation surface 1a. Also, the housing 12 is attached to a side opposite to the operation surface 1a of the display module 11, and protects the display module 11. With respect to the display module 11, one side of the operation surface 1a is referred to as the "front", and the other side that is the opposite side to the operation surface 1a is referred to as the "back" hereinafter.

Figure 3:
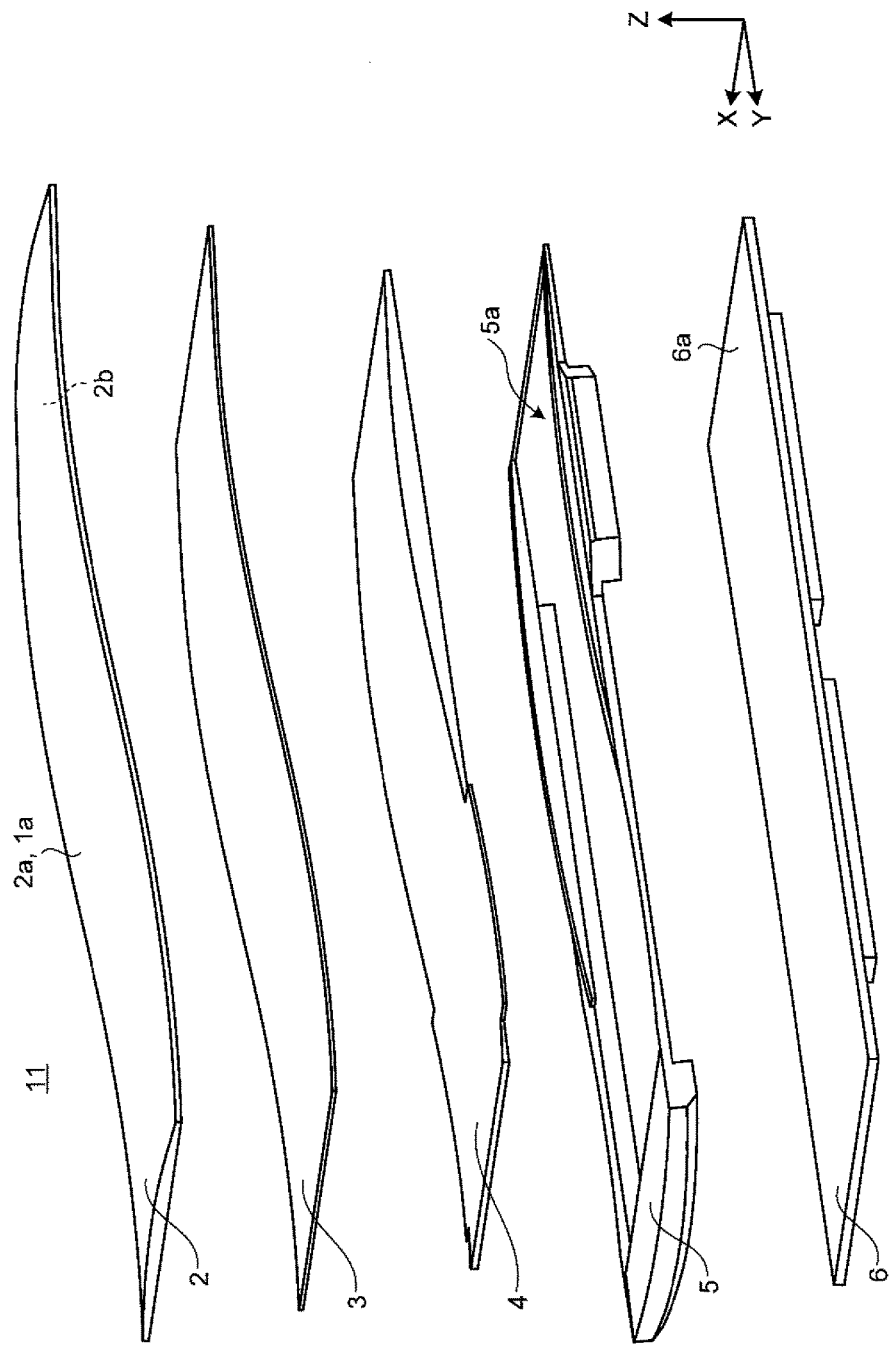
FIG. 3 is an exploded perspective view illustrating a configuration of a display module according to a first embodiment.
Figure 4:
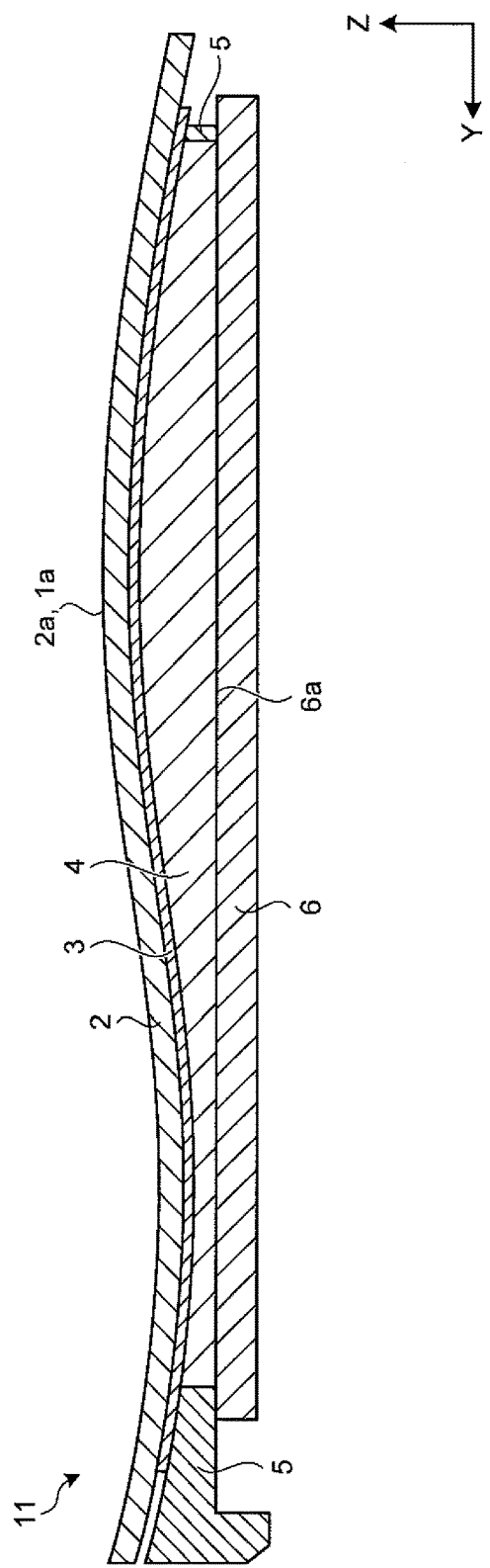
FIG. 4 is a cross-sectional view illustrating the display module according to the first embodiment.

FIG. 3 is an exploded perspective view illustrating a configuration of the display module 11. FIG. 4 is a cross-sectional view illustrating the display module 11 at the position of IV-IV in FIG. 2. In FIGS. 3 and 4, the upper side of the drawings corresponds to the front of the display module 11 and the lower side of the drawings corresponds to the back of the display module 11.

Hereinafter, the direction and orientation are appropriately indicated by using the three-dimensional orthogonal coordinate system (X Y Z) illustrated in the drawings. The orthogonal coordinate system is relatively fixed to the display module 11.

The X-axis direction and the Y-axis direction are set along a display surface 6a of a display 6 mentioned later. The X-axis direction corresponds to the "left/right direction" of the display surface 6a. The Y-axis direction corresponds to the "up/down direction" of the display surface 6a. Moreover, the Z-axis direction corresponds to the direction from the front to the back of the display module 11, and is referred to as the "depth direction" hereinafter. The positive X side corresponds to the left side of the display surface 6a, and the negative X side corresponds to the right side of the display surface 6a. Also, the positive Y side corresponds to the lower side of the display surface 6a, and the negative Y side corresponds to the upper side of the display surface 6a. Moreover, the positive Z side corresponds to the front of the display module 11, and the negative Z side corresponds to the back of the display module 11. In FIG. 4, to facilitate understanding of the configuration of the display module 11, width in the depth direction (Z-axis direction) is emphasized more than actual width.

As illustrated in FIGS. 3 and 4, the display module 11 includes a cover member 2, a touch sensor 3, a clear resin body 4, a frame 5, and the display 6, which are overlapped one another in the depth direction (Z-axis direction).

The cover member 2 is a clear member made of glass, plastic, or the like having light-transmission characteristics, and is placed in the most front (positive Z side) of the display module 11. A first principal surface 2a in front (positive Z side) of the cover member 2 becomes the operation surface 1a that the user actually touches and on which the touch operation is performed. In other words, the cover member 2 includes the curved first principal surface 2a.

The touch sensor 3 is placed on a second principal surface 2b in back (negative Z side) of the cover member 2, and detects the touch operation with respect to the first principal surface 2a (namely, operation surface 1) in front (positive Z side) of the cover member 2. The touch sensor 3 adopts, for example, electrostatic capacity type as a detection method, and detects a touch position of the touch operation with respect to the operation surface 1a on the basis of a change in the electrostatic capacity. The touch sensor 3 is a clear film-shaped member having the light-transmission characteristics as a component, and can be curved arbitrarily. In the display module 11, the touch sensor 3 is placed along the second principal surface 2b in back (negative Z side) of the cover member 2 in a state where the touch sensor 3 is curved.

The display 6 is a flat panel display, such as an organic EL display and a liquid crystal display, which displays various images. The display 6 includes, in front (positive Z side) of the display 6, the planar display surface 6a on which images are displayed. In the display module 11, the cover member 2 is arranged so as to overlap with the display surface 6a in front (positive Z side) of the display 6, and the touch sensor 3 is arranged between the cover member 2 and the display 6.

The frame 5 is a frame-shaped member that is made of glass, plastic, or the like and includes an opening 5a that is opened in the depth direction (Z-axis direction) at a middle portion of the frame 5. In front (positive Z side) of the frame 5, the frame 5 is joined to a peripheral part in back (negative Z side) of the touch sensor 3. In back (negative Z side) of the frame 5, the frame 5 is joined to a peripheral part in front (positive Z side) of the display 6. In the frame 5, a part joined to the touch sensor 3 is curved in accordance with the shape of the touch sensor 3, and a part joined to the display 6 is planar in accordance with the shape of the display surface 6a of the display 6.

The clear resin body 4 is a transmission body having the light-transmission characteristics, and is arranged so as to fill a space (opening 5a of frame 5) surrounded by the touch sensor 3, the display 6, and the frame 5 so that the space is not hollow. The clear resin body 4 is molded by hardening Optically Clear Resin (OCR) to be mentioned later. Moreover, in the clear resin body 4, a part touching the touch sensor 3 is curved along the shape of the touch sensor 3, and a part touching the display 6 is planar along the shape of the display surface 6a of the display 6.

As illustrated in FIG. 4, by the existence of the clear resin body 4, the space between the cover member 2 and the display 6 is filled not to be hollow. As a result, because an airless layer is totally formed between the first principal surface 2a (operation surface 1a) of the cover member 2 and the display surface 6a of the display 6, an air layer between them is excluded.

1-3. Shape of Cover Member

Figure 5:
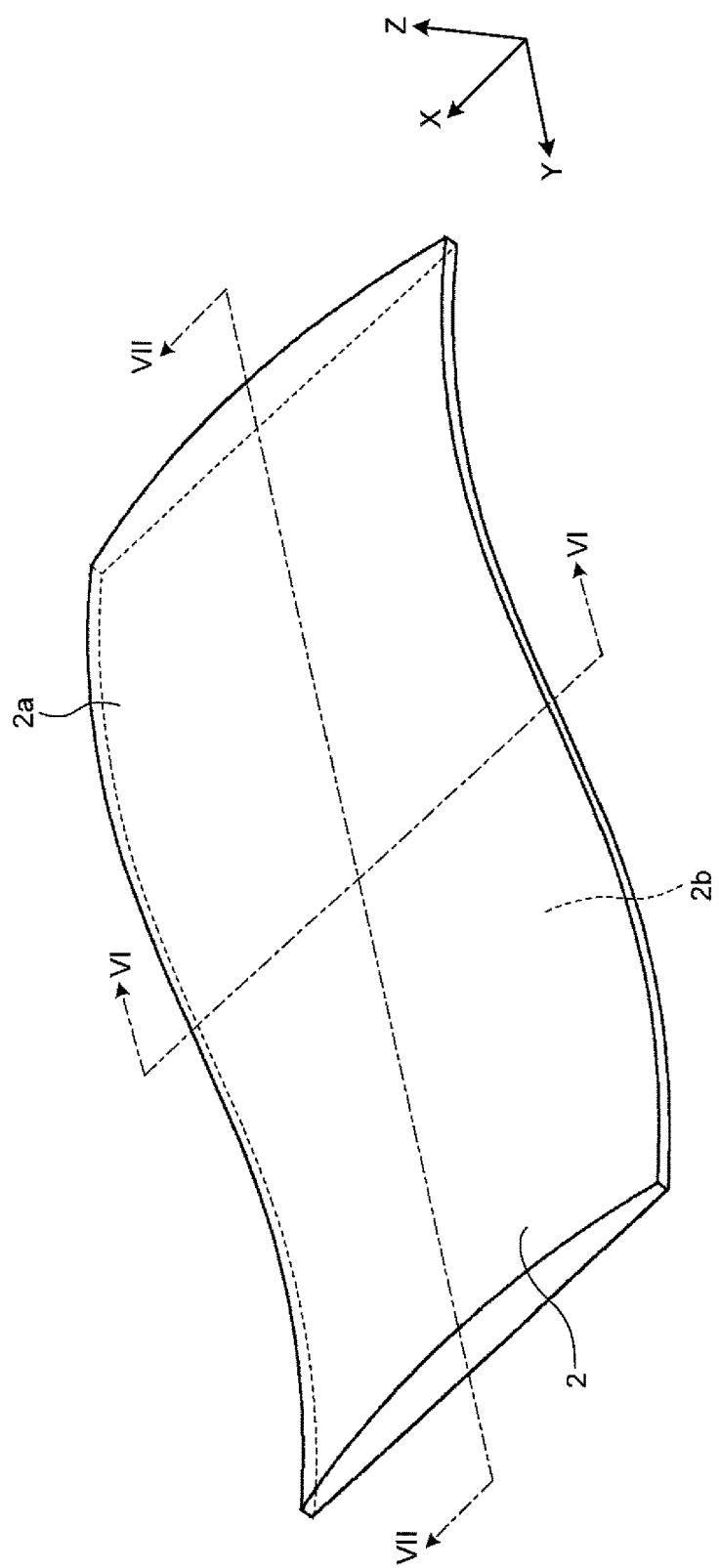
FIG. 5 is a perspective view illustrating a cover member.
Figure 6:
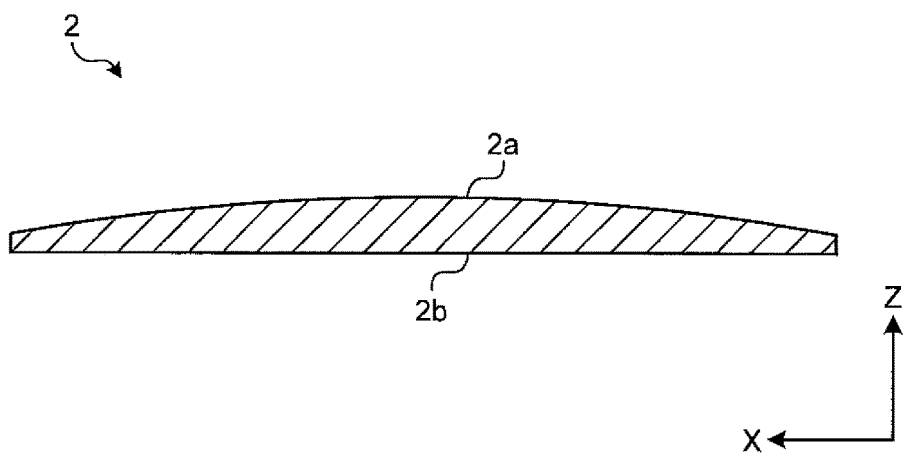
FIG. 6 is a cross-sectional view illustrating the cover member.
Figure 7:
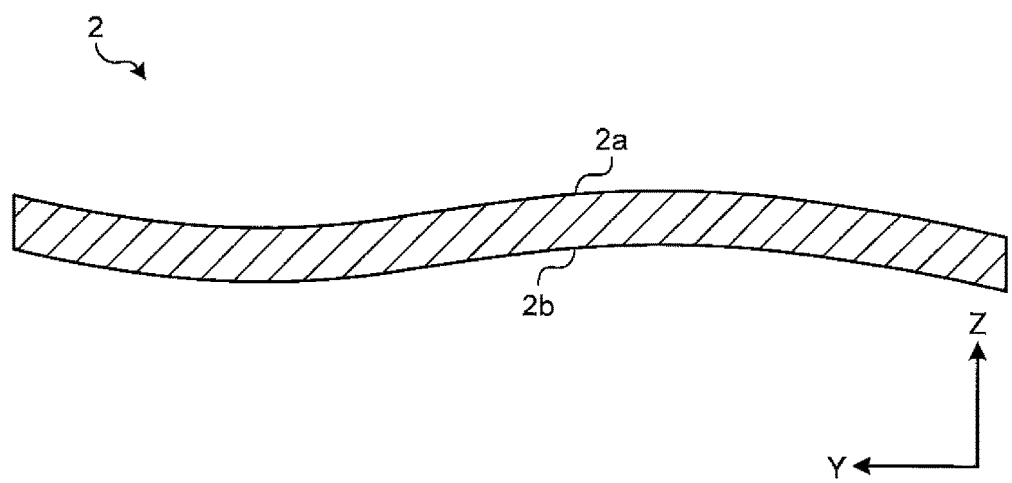
FIG. 7 is a cross-sectional view illustrating the cover member.

Next, the shape of the cover member 2 will be explained in detail. FIGS. 5 to 7 are diagrams illustrating the shape of the cover member 2. FIG. 5 is a perspective view illustrating the cover member 2. FIG. 6 is a cross-sectional view illustrating the cover member 2 along the left/right direction (X-axis direction) at the VI-VI position in FIG. 5. FIG. 7 is a cross-sectional view illustrating the cover member 2 along the up/down direction (Y-axis direction) at the VII-VII position in FIG. 5. In these drawings, to facilitate understanding of the shape of the cover member 2, curvature of curved surfaces and width in the depth direction (Z-axis direction) are emphasized more than actual curvature and width.

Hereinafter, a curved surface that is curved in two or more directions that are mutually different is referred to as a "three-dimensional curved surface", and a curved surface that is curved in only one direction is referred to as a "two-dimensional curved surface". The three-dimensional curved surface is a comparatively complicated curved surface, such as a surface of a spherical body, which cannot be obtained by curving a plane. On the other hand, the two-dimensional curved surface is a comparatively simple curved surface, such as a surface of a cylindrical body, which can be obtained by curving a plane.

As illustrated in FIGS. 5 and 6, the first principal surface 2a of the cover member 2 is a curved surface that is curved into a circular-arc shape in the left/right direction (X-axis direction). On the other hand, the second principal surface 2b of the cover member 2 is not curved in the left/right direction (X-axis direction) and is linear along the left/right direction (X-axis direction). Thus, as illustrated in FIG. 6, a cross-section of the cover member 2 in the left/right direction (X-axis direction) leads to a semi-cylindrical shape whose width in the depth direction (Z-axis direction) becomes the maximum at the center portion in the left/right direction.

As illustrated in FIGS. 5 to 7, the first principal surface 2a of the cover member 2 is a curved surface that is curved into an S-shape in the up/down direction (Y-axis direction). Also, the second principal surface 2b of the cover member 2 is a curved surface that is curved into an S-shape in the up/down direction (Y-axis direction). In other words, in the up/down direction (Y-axis direction), the shape of the second principal surface 2b of the cover member 2 is substantially the same as that of the first principal surface 2a. Thus, as illustrated in FIG. 7, the cross-section of the cover member 2 in the up/down direction (Y-axis direction) leads to an S-shape whose length in the depth direction (Z-axis direction) is substantially constant.

In this way, the first principal surface 2a (operation surface 1a) of the cover member 2 is the three-dimensional curved surface that is curved in the left/right direction (X-axis direction) and the up/down direction (Y-axis direction). On the contrary, the second principal surface 2b of the cover member 2 is the two-dimensional curved surface that is curved only in the up/down direction (Y-axis direction).

Because the film-shaped touch sensor 3 cannot be shaped into the three-dimensional curved surface, if the second principal surface 2b of the cover member 2 is the three-dimensional curved surface whose shape is the same as that of the first principal surface 2a, the touch sensor 3 cannot be placed along the second principal surface 2b.

Figure 8:
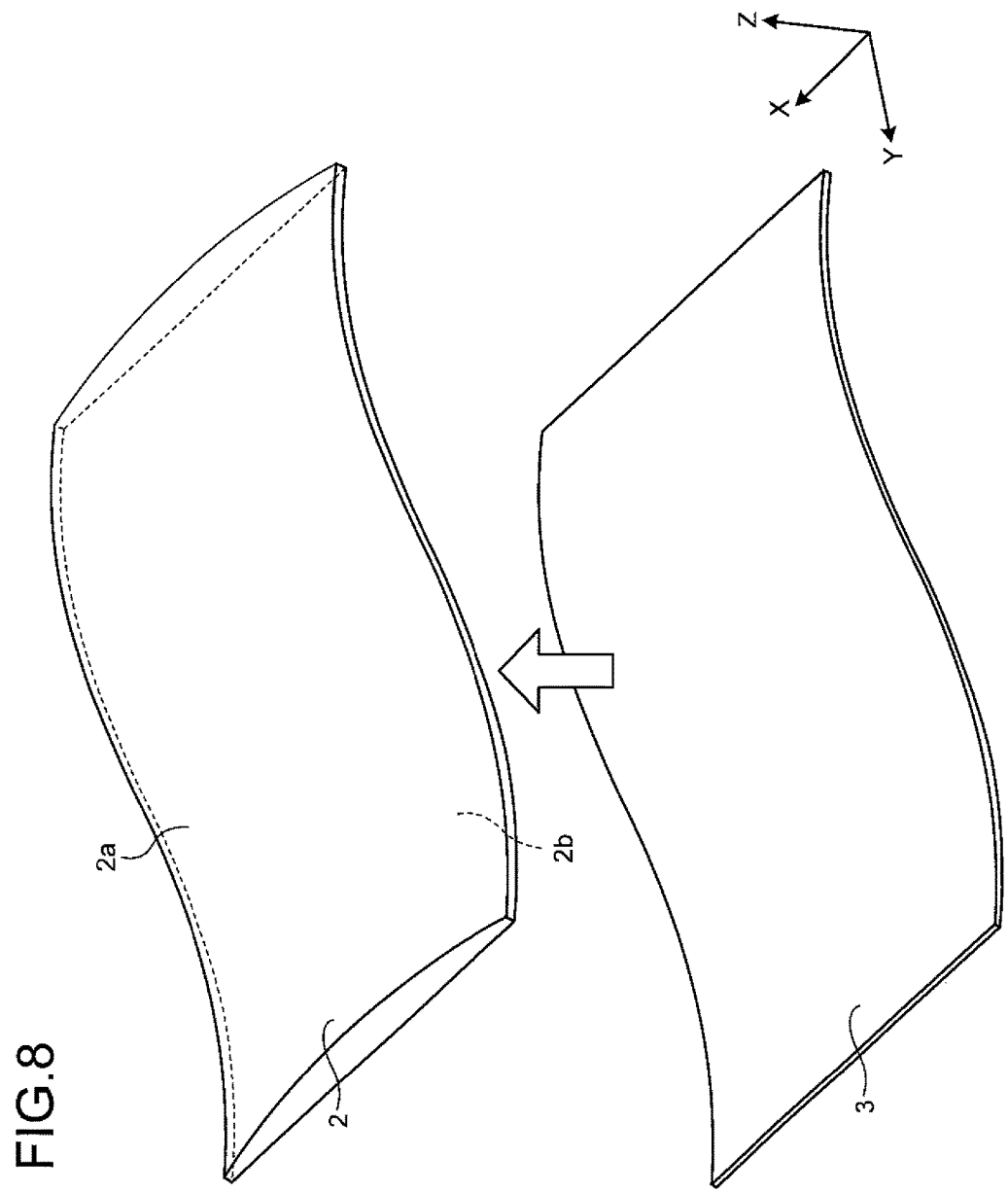
FIG. 8 is a diagram illustrating joining of the cover member and a touch sensor.

In the present embodiment, because the second principal surface 2b of the cover member 2 is the two-dimensional curved surface, the touch sensor 3 can be shaped so as to have the two-dimensional curved surface whose shape is substantially the same as that of the second principal surface 2b. In a manufacturing process of the display module 11, as illustrated in FIG. 8, the touch sensor 3 is shaped into a curved surface that is curved in an S-shape in the up/down direction (Y-axis direction), and subsequently the touch sensor 3 is joined to the second principal surface 2b of the cover member 2. Thus, in the display module 11, the touch sensor 3 is placed along the second principal surface 2b of the cover member 2.

A display module may be considered that has a configuration in which the second principal surface 2b of the cover member 2 is shaped into a planar surface and the touch sensor 3 is joined to the planar surface. However, the display module having the aforementioned configuration has irregular interval between the first principal surface 2a (operation surface 1a) of the cover member 2 and the touch sensor 3. Thus, there is a possibility that difference in detection sensitivity of the touch operation by the touch sensor 3 may occur between portions of the operation surface 1a.

In the display module 11 according to the present embodiment, the shape of the second principal surface 2b of the cover member 2 is substantially the same as that of the first principal surface 2a in the up/down direction (Y-axis direction). Therefore, because irregular intervals between the first principal surface 2a (operation surface 1a) of the cover member 2 and the touch sensor 3 can be reduced, the difference in detection sensitivity of the touch operation between portions of the operation surface 1a can be reduced. Therefore, it is desirable to provide the display module 11 of the configuration according to the present embodiment.

1-4. Exclusion of Air Layer

As described above, in the display module 11 according to the present embodiment, the space between the cover member 2 and the display 6 is filled by the clear resin body 4 so that the space is not hollow. As a result, an airless layer is totally formed between the first principal surface 2a (operation surface 1a) of the cover member 2 and the display surface 6a of the display 6, and the air layer inside the display module 11 is excluded. In the display module 11, various effects are obtained by excluding the air layer as described above. Hereinafter, this point will be explained.

Figure 9:
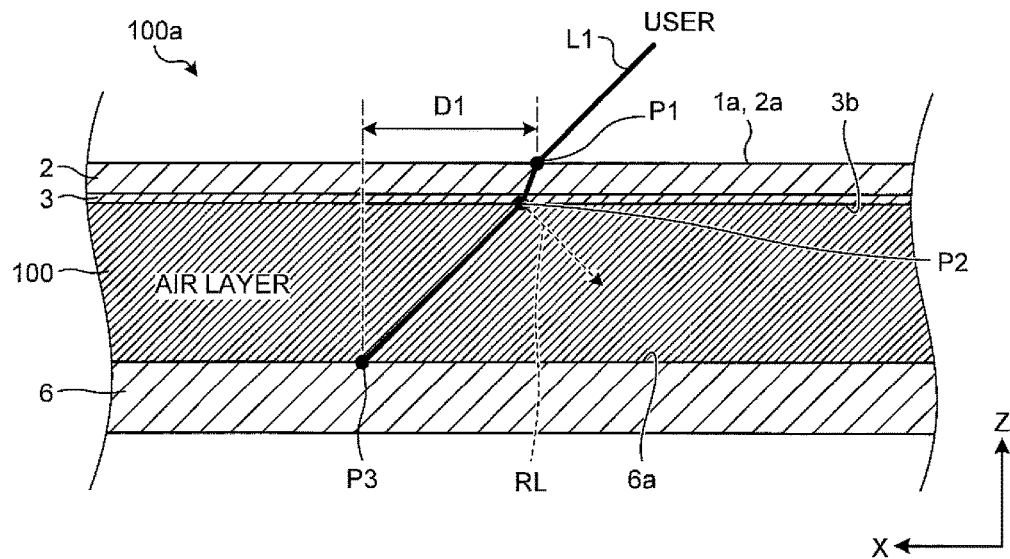
FIG. 9 is an enlarged cross-sectional view illustrating a display module according to a comparative example.

FIG. 9 is an enlarged cross-sectional view illustrating a display module 100a that includes therein an air layer 100 according to a comparative example. The display module 100a has the same configuration as that of the display module 11 according to the present embodiment, except that the air layer 100 is included instead of the clear resin body 4. With reference to FIG. 9, problems in the display module 100a according to the comparative example will be explained.

In FIG. 9, the user visually recognizes the operation surface 1a from the position that is displaced in the left/right direction from the front surface of the operation surface 1a. Incident light L1 is assumed that is incident on a position P1 of the operation surface 1a from the position of eyes of the user. Difference in refractive index is large between air and members (the cover member 2, the touch sensor 3). Thus, the incident light L1 is refracted at the position P1 on the operation surface 1a that becomes a boundary between the external air layer and the member. Moreover, the incident light L1 is refracted again at a position P2 on a back surface 3b of the touch sensor 3, which becomes a boundary between the member and the internal air layer 100.

As a result, the incident light L1 passes through the air layer 100 by way of substantially the same route as the extension line of the route of light incident on the operation surface 1a, and arrives at a position P3 on the display surface 6a of the display 6. From the principle of reversibility of light-path, display light from the position P3 on the display surface 6a arrives at the eyes of the user by way of a route opposite to that of the incident light L1. Therefore, from the user, the position P1 of the operation surface 1a seems to overlap with an image displayed at the position P3 on the display surface 6a.

When the user instructs the image display apparatus 1 to perform various instructions, the user performs the touch operation on the position of the operation surface 1a with which an image, such as a command button displayed on the display surface 6a, is overlapped. Thus, when the image such as the command button is displayed at the position P3 on the display surface 6a, the user is to perform the touch operation on the position P1 of the operation surface 1a. Therefore, in this case, misalignment is caused between the display position P3 of the image and the touch position P1 of the touch operation.

A misalignment size D1 between the display position of the image and the touch position becomes larger as the width of the air layer 100 in the depth direction (X-axis direction) becomes larger. In the display module 100a, because the curved operation surface 1a and the planar display surface 6a are combined, an interval between the operation surface 1a and the display surface 6a is not constant, and a part occurs on which the width of the air layer 100 in the depth direction (Z-axis direction) becomes larger. In such a part, because the misalignment size D1 between the display position of the image and the touch position becomes larger, there is a possibility that the user cannot perform desired instructions correctly.

A part of display light emitted from the display surface 6a of the display 6 reflects at the boundary between the air layer 100 and the member, and diffuses inside the air layer 100 as reflected light RL. Similarly, external light such as sunlight that is incident from the outside reflects at the boundary between the air layer 100 and the member, and diffuses inside the air layer 100 as the reflected light RL. Because of the existence of the reflected light RL, visibility of images displayed on the display surface 6a becomes worse.

Figure 10:
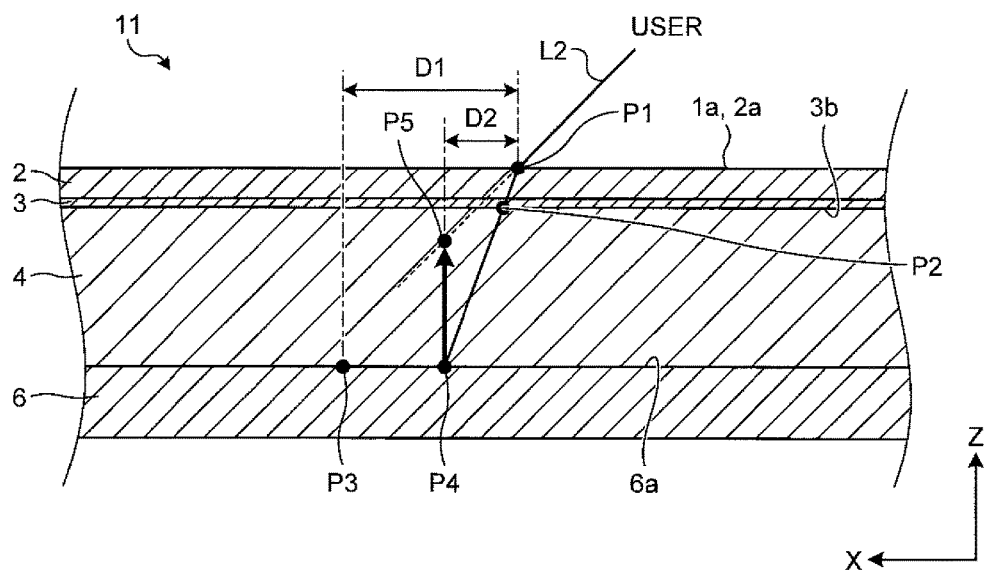
FIG. 10 is an enlarged cross-sectional view illustrating the display module according to the first embodiment.

On the contrary, in the display module 11 according to the present embodiment, because the internal air layer is excluded by the existence of the clear resin body 4, these problems are eased. FIG. 10 is an enlarged cross-sectional view illustrating the display module 11 that includes the clear resin body 4 according to the present embodiment.

In FIG. 10, the user visually recognizes the operation surface 1a from the same position as that in the case of FIG. 9. Incident light L2 is assumed that is incident on the position P1 of the operation surface 1a from the position of eyes of the user. Also in this case, the incident light L2 is refracted at the position P1 on the operation surface 1a that becomes a boundary between the external air layer and the member. However, because difference in refractive index between the cover member 2, the touch sensor 3, and the clear resin body 4 is small, the incident light L2 is hardly refracted at the boundary between these members. Therefore, the incident light L2 arrives at a position P4 on the display surface 6a of the display 6 while approximately keeping the refracted angle after the incident light L2 is refracted at the position P1 on the operation surface 1a.

From the principle of reversibility of light-path, a display light from the position P4 on the display surface 6a arrives at the eyes of the user by way of a route opposite to that of the incident light L2. Therefore, from the user, the position P1 of the operation surface 1a seems to overlap with an image displayed at the position P4 on the display surface 6a. In this case, the user has an illusion that an image displayed at the position P4 is on a position P5 that is located on an extended line of the route via which the incident light L2 is incident on the operation surface 1a. From this principle, the image displayed on the display surface 6a seems to float up toward the operation surface 1a in the positive Z direction when seen from the user.

Also in this case, misalignment is caused between the display position P4 of the image and the touch position P1 of the touch operation. However, as is evident from the comparison between FIG. 9 and FIG. 10, a misalignment size D2 in a case where the air layer is excluded is sufficiently small compared with the misalignment size D1 in a case where the air layer 100 is included. Therefore, because the misalignment between the display position of the image and the touch position is largely eased, the user can perform desired instructions correctly.

As described above, because the difference in refractive index between the cover member 2, the touch sensor 3, and the clear resin body 4 is small, reflection of light at the boundary between these is restrained. For this reason, because the reflected light RL inside the display module 11 is largely restrained, the visibility of images displayed on the display surface 6a can be improved.

1-5. Manufacturing Method of Display Module

Next, a manufacturing method of the display module 11 will be explained. The members 2, 3, 5, and 6 that constitute the display module 11 are joined to one another by appropriately using adhesive, for example, such as OCR (Optical Clear Resin) and OCA (Optical Clear Adhesive).

The OCR is adhesive that is coated or filled in liquid state and has characteristics of hardening under a certain condition. The OCR has the light-transmission characteristics also after hardening. The OCR according to the present embodiment is ultraviolet curable and is hardened by, for example, irradiation of ultraviolet. When using ultraviolet curable OCR, it is preferable that all the members 2, 3, 5, and 6 that constitute the display module 11 have ultraviolet-transmission characteristics. Also, the OCA is sheet-shaped adhesive that has adherence characteristics on its both surfaces and further has the light-transmission characteristics. Both the surfaces of the OCA before use are covered with separators (separating sheets), and the separators are separated and removed when the OCA is used.

Figure 11:
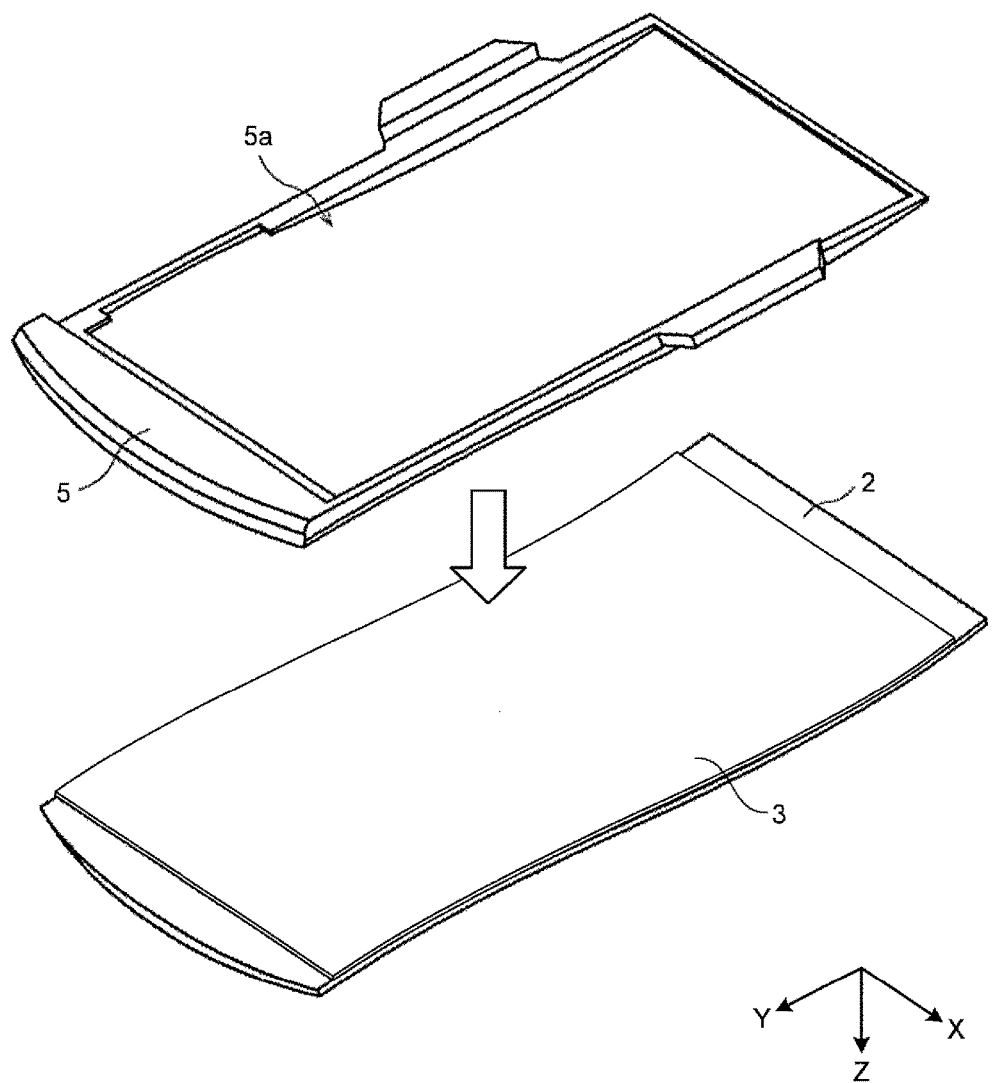
FIG. 11 is a diagram illustrating a part of manufacturing processes of the display module.
Figure 12:
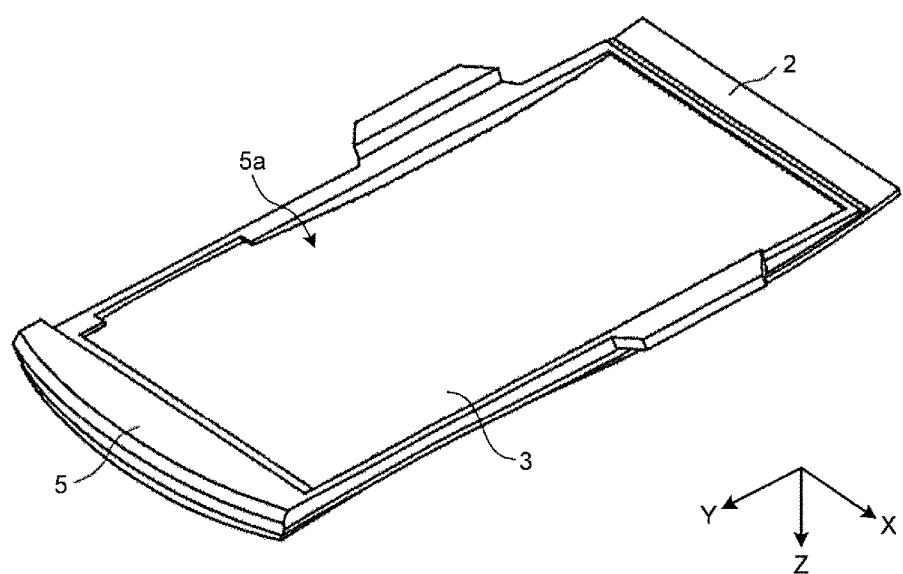
FIG. 12 is a diagram illustrating a part of the manufacturing processes of the display module.

As illustrated in FIG. 8, the touch sensor 3 is shaped into an S-shaped two-dimensional curved surface, and then is joined to the second principal surface 2b in back (negative Z side) of the cover member 2. Next, as illustrated in FIG. 11, the frame 5 is attached to the surface in back (negative Z side) of the touch sensor 3, for example, by using the OCR. Next, ultraviolet is irradiated from surroundings of the frame 5 to harden the OCR, and thus the members are fixed to each other. Therefore, as illustrated in FIG. 12, a container-shaped space that can store liquid is formed at the opening 5a that is surrounded by the touch sensor 3 and the frame 5.

Figure 13:
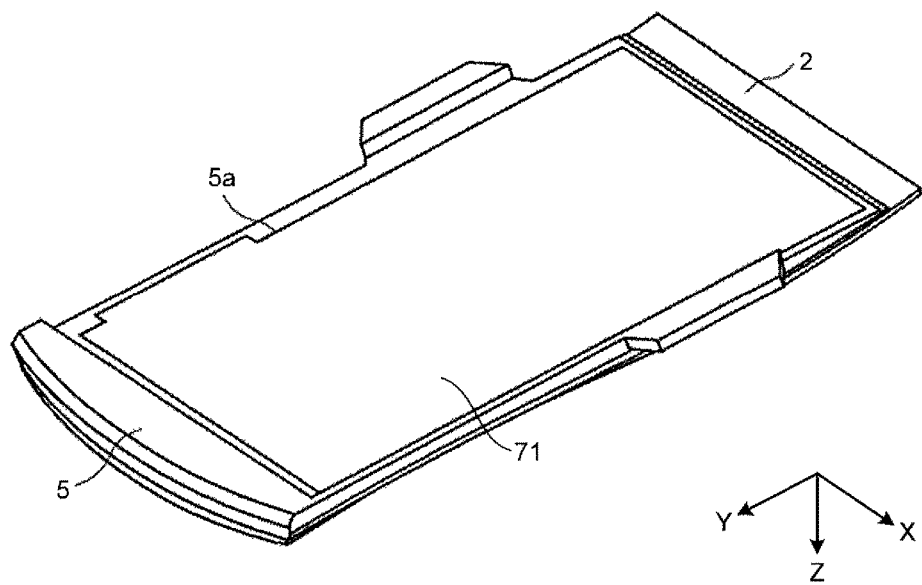
FIG. 13 is a diagram illustrating a part of the manufacturing processes of the display module.

Next, as illustrated in FIG. 13, liquid OCR 71 is poured into the opening 5a of the frame 5 by using a dispenser or the like. The liquid OCR 71 is filled so as to totally fill the opening 5a of the frame 5. Next, ultraviolet is irradiated from both sides of the depth direction (Z-axis direction) and the liquid OCR 71 filled in the opening 5a of the frame 5 is hardened. As a result, as illustrated in FIG. 14, the clear resin body 4 is formed at the opening 5a of the frame 5.

Figure 14:
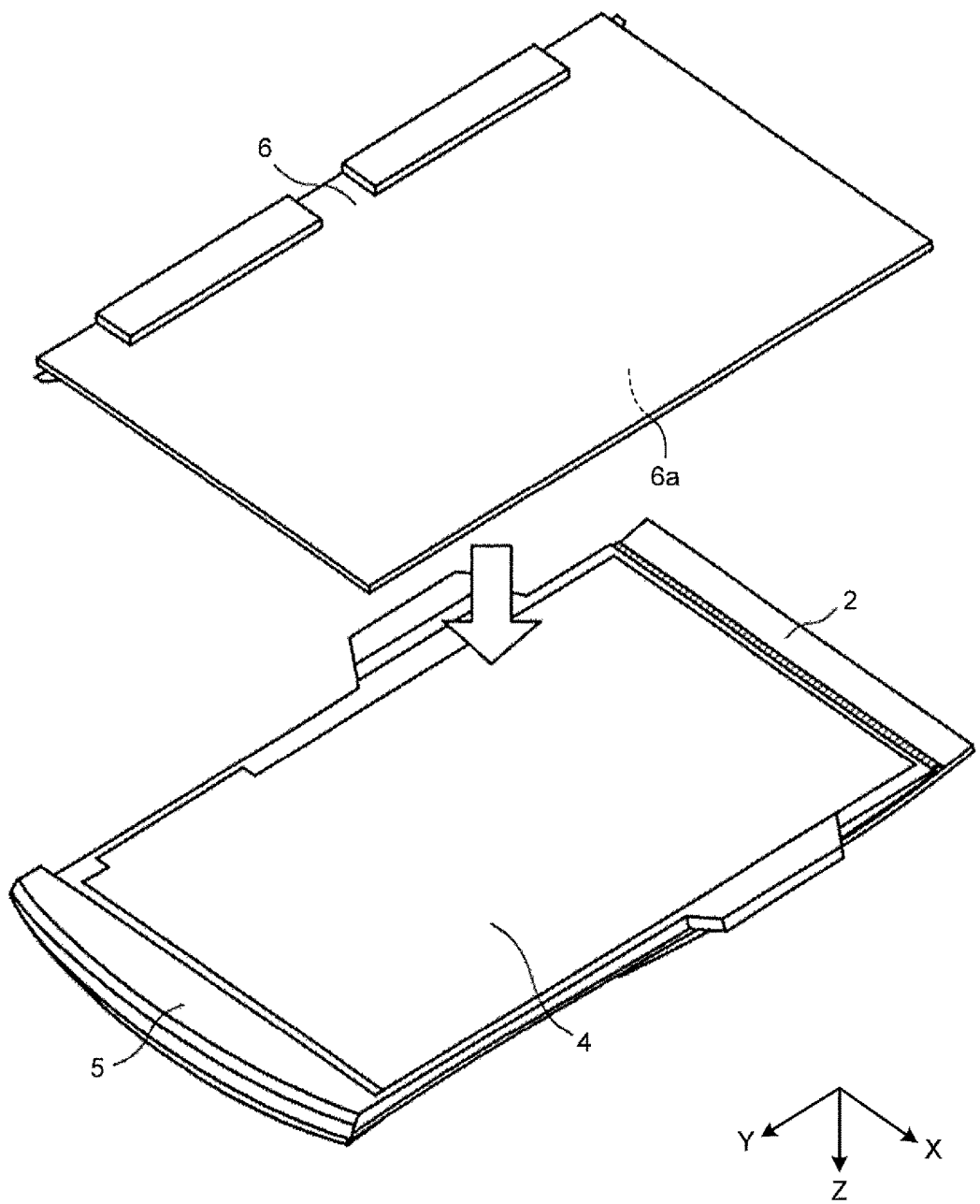
FIG. 14 is a diagram illustrating a part of the manufacturing processes of the display module.
Figure 15:
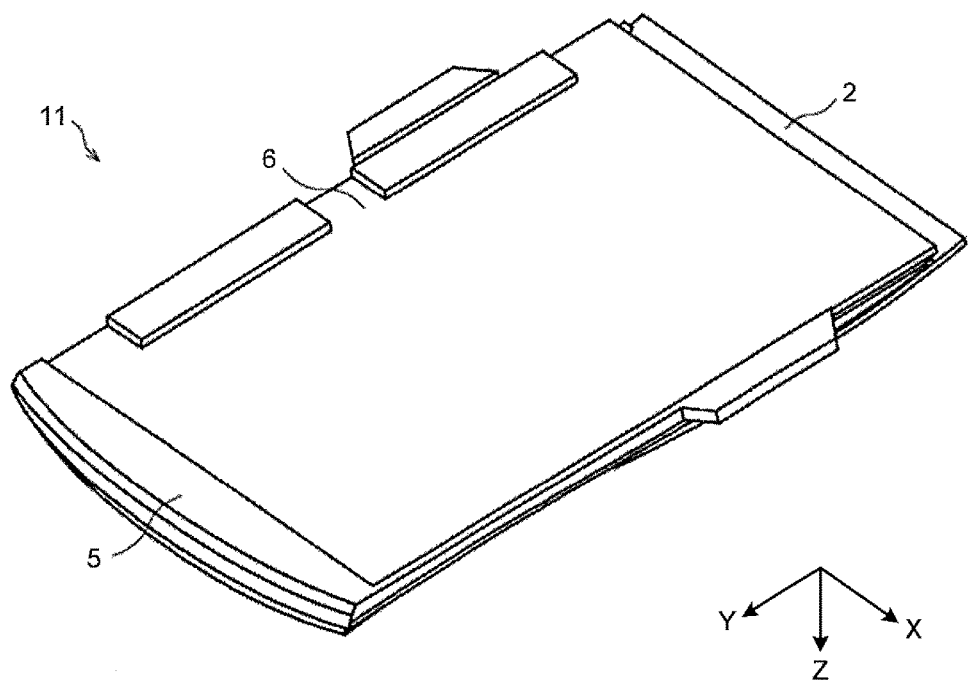
FIG. 15 is a diagram illustrating a part of the manufacturing processes of the display module.

Next, as illustrated in FIG. 14, the display 6 is attached to the surface in back (negative Z side) of the frame 5, for example, by using the OCR in such a manner that the display surface 6a of the display 6 is opposed to the clear resin body 4. Next, ultraviolet is irradiated from the front (positive Z side) and the OCR is hardened, and then the display 6 is fixed. In this way, as illustrated in FIG. 15, the display module 11 is produced.

As described above, the image display apparatus 1 according to the present embodiment includes the display 6 that includes the planar display surface 6a on which images are displayed, and the cover member 2 that includes the curved first principal surface 2a (operation surface 1a) that is arranged to overlap with the display surface 6a of the display 6 and is a target for the touch operation. The image display apparatus 1 further includes the touch sensor 3 that is arranged between the cover member 2 and the display 6 and detects the touch operation with respect to the first principal surface 2a (operation surface 1a) of the cover member 2.

In the image display apparatus 1, the clear resin body 4 is arranged between the cover member 2 and the display 6. The clear resin body 4 is a transmission body that fills the space between the cover member 2 and the display 6 so that the space is not hollow. Therefore, the airless layer is totally formed between the operation surface 1a and the display surface 6a, and the air layer between them is excluded. As a result, because an image displayed on the display surface 6a seems to float up toward the operation surface 1a, the misalignment between the display position of the image and the touch position of the touch operation can be reduced.

2. Second Embodiment

Next, the second embodiment will be explained. Because main configuration of the image display apparatus 1 according to the second embodiment is substantially the same as that of the first embodiment, difference from the first embodiment will be mainly explained hereinafter.

Figure 16:
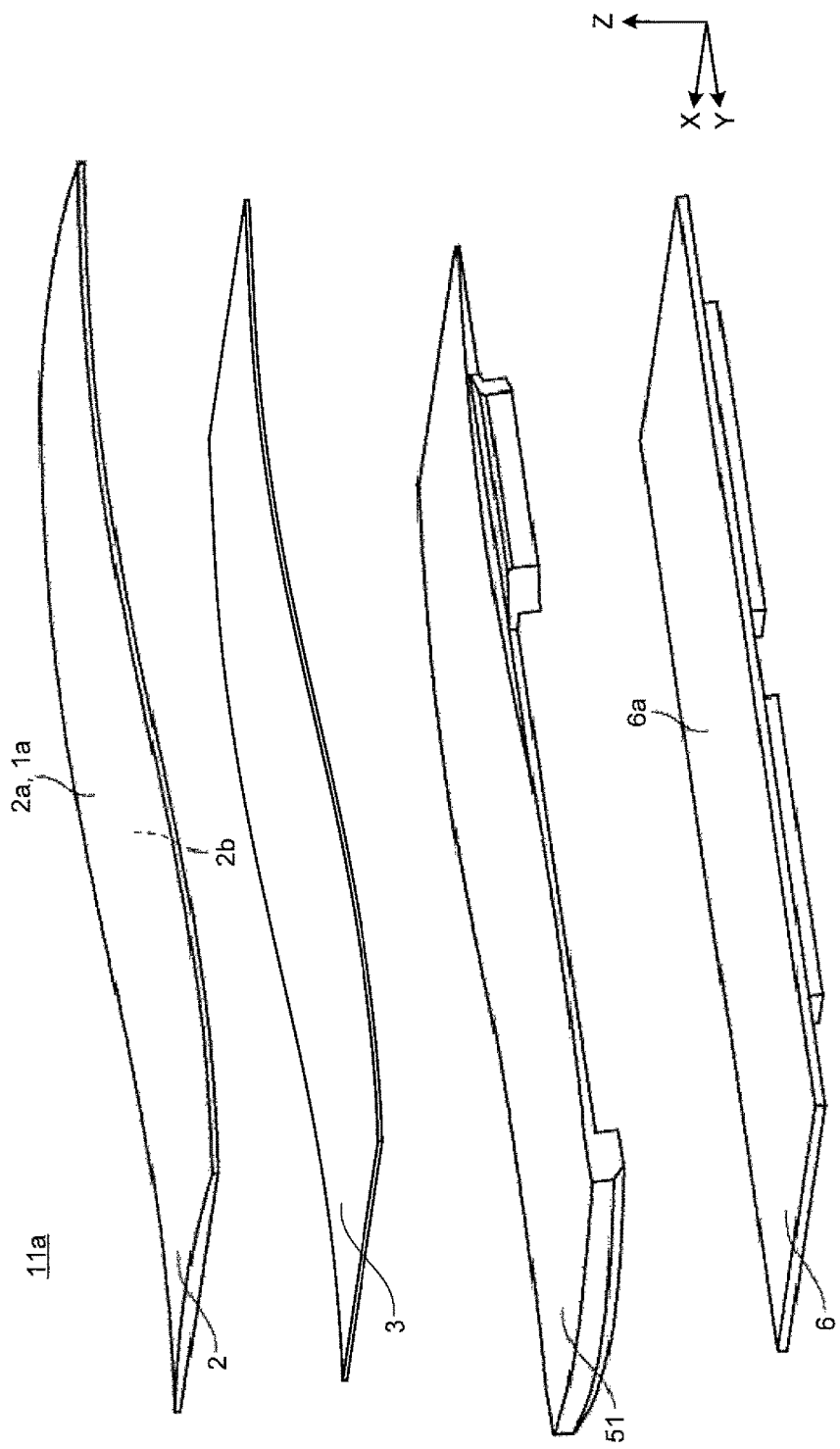
FIG. 16 is an exploded perspective view illustrating a configuration of a display module according to a second embodiment.
Figure 17:
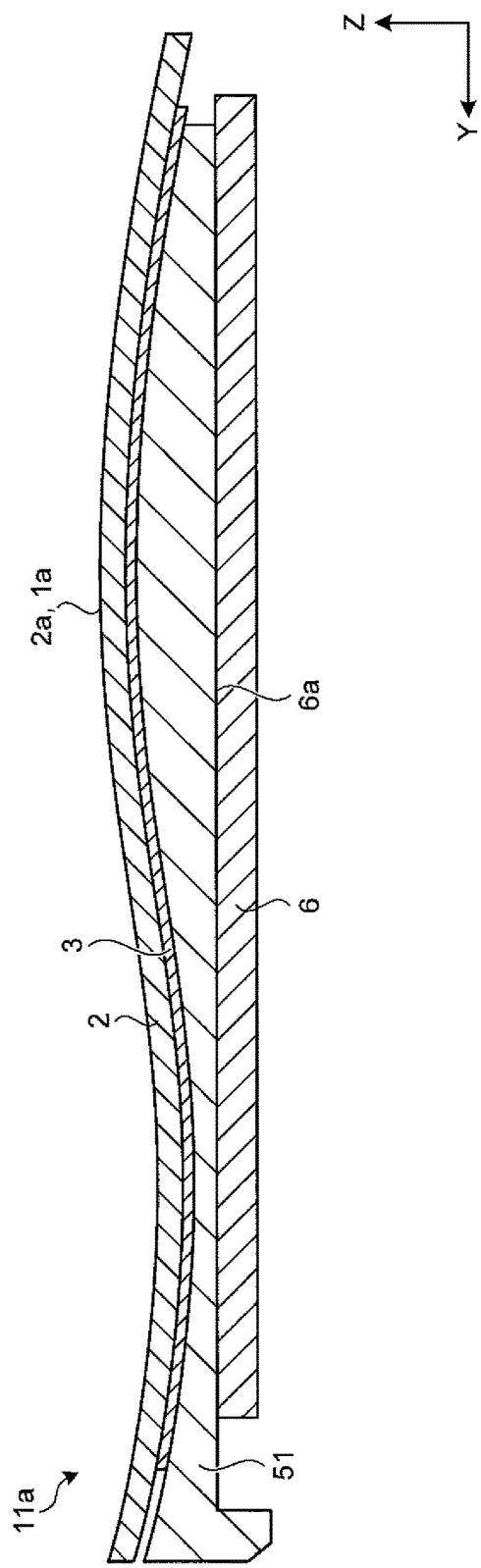
FIG. 17 is a cross-sectional view illustrating the display module according to the second embodiment.

FIG. 16 is an exploded perspective view illustrating a configuration of a display module 11a according to the second embodiment. FIG. 17 is a cross-sectional view illustrating the display module 11a according to the second embodiment and corresponds to a cross-sectional view at the position of IV-IV in FIG. 2. In FIGS. 16 and 17, the upper side of the drawings corresponds to the front of the display module 11a, the lower side of the drawings corresponds to the back of the display module 11a. In FIG. 17, to facilitate understanding of the configuration of the display module 11a, width in the depth direction (Z-axis direction) is emphasized more than actual width.

The display module 11a according to the second embodiment includes a solid frame 51, instead of the clear resin body 4 and the frame 5 according to the first embodiment. The solid frame 51 is a clear member made of glass, plastic, or the like having light-transmission characteristics. The solid frame 51 is shaped so as to be the same shape as that of a combination of the frame 5 and the clear resin body 4 according to the first embodiment.

As illustrated in FIG. 17, the solid frame 51 is arranged between the touch sensor 3 and the display 6. In front (positive Z side) of the solid frame 51, the solid frame 51 is joined to a surface in back (negative Z side) of the touch sensor 3. In back (negative Z side) of the solid frame 51, the solid frame 51 is joined to the display surface 6a in front (positive Z side) of the display 6. In the solid frame 51, a part joined to the touch sensor 3 is curved in accordance with the shape of the touch sensor 3, and a part joined to the display 6 is planar in accordance with the shape of the display surface 6a of the display 6.

The inside of the solid frame 51 is not hollow, and the solid frame 51 is a transmission body that fills a space between the cover member 2 and the display 6 so that the space is not hollow. By employing the above configuration, the display module 11a according to the present embodiment also includes an airless layer totally formed between the operation surface 1a and the display surface 6a, and thus an air layer between them is excluded. As a result, an image displayed on the display surface 6a seems to float up toward the operation surface 1a, and misalignment between the display position of the image and the touch position of the touch operation can be reduced.

In the present embodiment, because there is no need to use the comparatively expensive OCR for the formation of the clear resin body 4, the display module 11a can be manufactured comparatively cheaply. Moreover, because a process of forming the clear resin body 4 can be omitted, manufacturing time of the display module 11*a* can be shortened and further yields can be increased.

In the present embodiment, a surface in back (negative Z side) of the solid frame 51 is not need to be totally planar, and it is sufficient that at least a part to which the display surface 6*a* of the display 6 is joined is planar.

3. Third Embodiment

Next, the third embodiment will be explained. Because main configuration of the image display apparatus 1 according to the third embodiment is substantially the same as that of the first embodiment, difference from the first embodiment will be mainly explained hereinafter.

Figure 18:
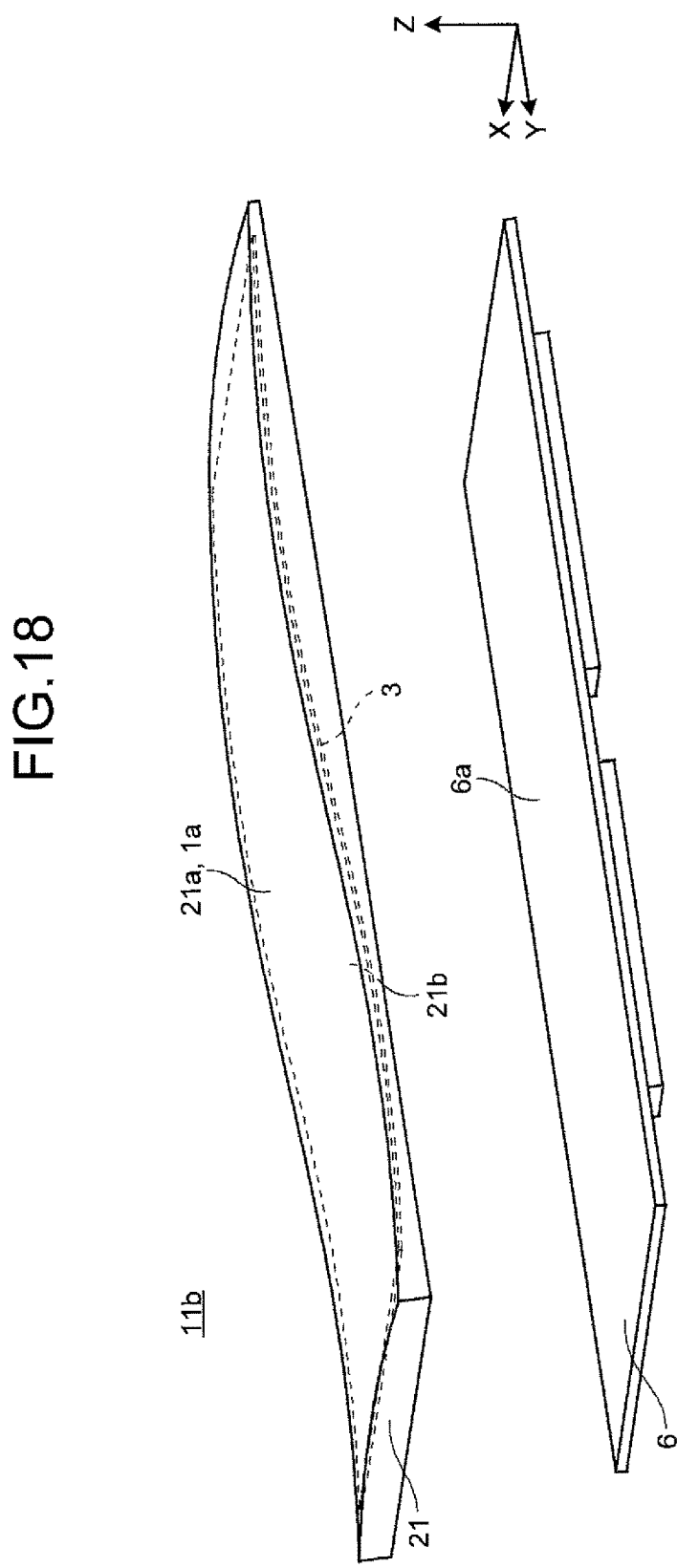
FIG. 18 is an explored perspective view illustrating a configuration of a display module according to a third embodiment.
Figure 19:
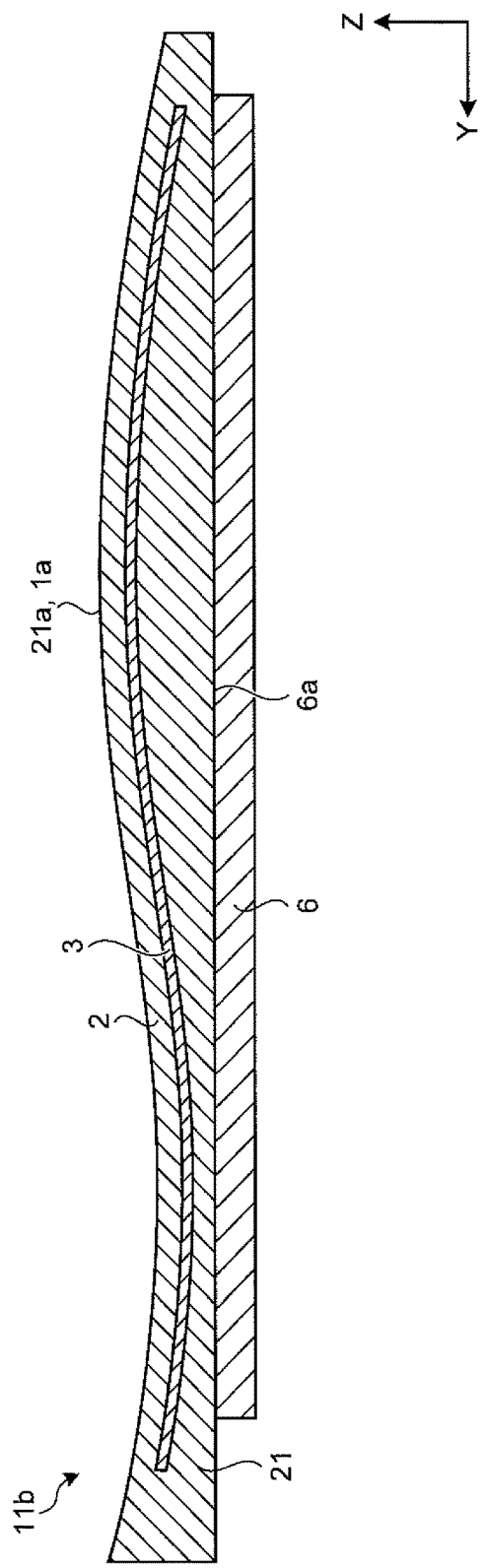
FIG. 19 is a cross-sectional view illustrating the display module according to the third embodiment.

FIG. 18 is an exploded perspective view illustrating a configuration of a display module 11*b* according to the third embodiment. FIG. 19 is a cross-sectional view illustrating the display module 11*b* according to the third embodiment and corresponds to a cross-sectional view at the position of IV-IV in FIG. 2. In FIGS. 18 and 19, the upper side of the drawings corresponds to the front of the display module 11*b*, and the lower side of the drawings corresponds to the back of the display module 11*b*. In FIG. 19, to facilitate understanding of the configuration of the display module 11*b*, width in the depth direction (Z-axis direction) is emphasized more than actual width.

The display module 11*b* according to the third embodiment includes a cover member 21, the touch sensor 3, and the display 6.

The cover member 21 is a clear member made of glass, plastic, or the like having light-transmission characteristics. A first principal surface 21*a* in front (positive Z side) of the cover member 21 is the operation surface 1*a* that the user actually touches and on which the touch operation is performed. The first principal surface 21*a* has the three-dimensional curved shape that is the same as that of the first principal surface 2*a* of the cover member 2 according to the first embodiment. On the contrary, a second principal surface 21*b* in back (negative Z side) of the cover member 21 is planar in accordance with the shape of the display surface 6*a* of the display 6.

The display surface 6*a* of the display 6 is joined to the planar second principal surface 21*b* of the cover member 21. Therefore, the display 6 is placed along the second principal surface 21*b*.

The touch sensor 3 is placed in a state where the touch sensor 3 is embedded inside the cover member 21. In other words, the touch sensor 3 is arranged between the first principal surface 21*a* and the second principal surface 21*b* of the cover member 21.

The touch sensor 3 is shaped to be the two-dimensional curved surface whose shape is the same as that in the case of the first embodiment, and a relative position between the first principal surface 21*a* of the cover member 21 and the touch sensor 3 is the same as that between the first principal surface 2*a* of the cover member 2 and the touch sensor 3 according to the first embodiment. Therefore, the touch sensor 3 can detect the touch operation with respect to the operation surface 1*a*, similarly to the first embodiment.

In this way, the cover member 21 according to the present embodiment is a part that is integrated with the touch sensor 3. The cover member 21 is, for example, molded by filling a metal mold with material such as resin after placing the touch sensor 3 at a predetermined position in the metal mold.

A space between the first principal surface 21*a* and the second principal surface 21*b* of the cover member 21 is not hollow. By such a configuration, also in the display module 11*b* according to the present embodiment, an airless layer is totally formed between the operation surface 1*a* and the display surface 6*a*, and an air layer between them is excluded. As a result, an image displayed on the display surface 6*a* seems to float up toward the operation surface 1*a*, and the misalignment between the display position of the image and the touch position of the touch operation can be reduced.

Also in the present embodiment, because there is no need to use the comparatively expensive OCR for the formation of the clear resin body 4, the display module 11*b* can be manufactured comparatively cheaply. Moreover, because the display module 11*b* can be manufactured by joining two parts that are the cover member 21 and the display 6, manufacturing time of the display module 11*b* can be shortened and further yields can be increased.

In the present embodiment, the second principal surface 21*b* in back (negative Z side) of the cover member 21 is not need to be totally planar, and it is sufficient that at least a part to which the display surface 6*a* of the display 6 is joined is planar.

4. Technique of Joining Curved Surfaces

In the aforementioned first and second embodiments, when joining members that constitute the display modules 11 and 11*a*, curved surfaces need to be joined to each other in such a manner that they face each other.

Figure 20:
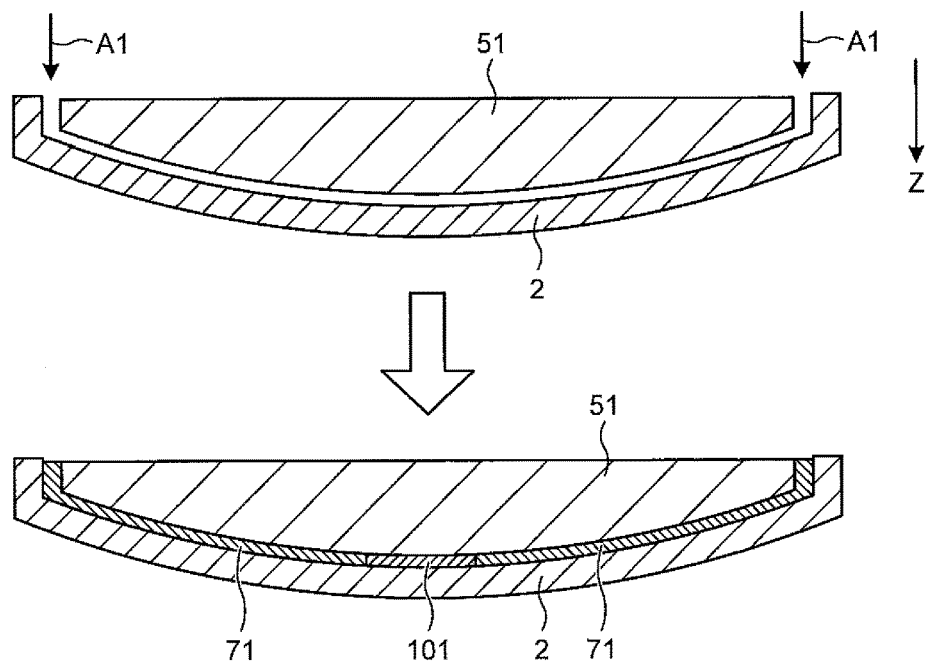
FIG. 20 is a diagram illustrating an example of a technique of joining curved surfaces facing each other.

In such a case that curved surfaces facing each other are joined to each other, there is a possibility that air bubbles occur if the OCR is used. FIG. 20 illustrates an appearance of joining a curved surface of the solid frame 51 to a curved surface of the cover member 2 when producing the display module 11*a* that adopts the solid frame 51 similar to the one according to the second embodiment. As illustrated in FIG. 20, it is assumed that the solid frame 51 is brought close to the cover member 2 and an OCR 71 is poured from the peripheral part of the solid frame 51 as indicated by an arrow A1. In this case, a part of air may not be released from a peripheral part of the solid frame 51, and there is a possibility that an air bubble 101 occurs between the cover member 2 and the solid frame 51.

Figure 21:
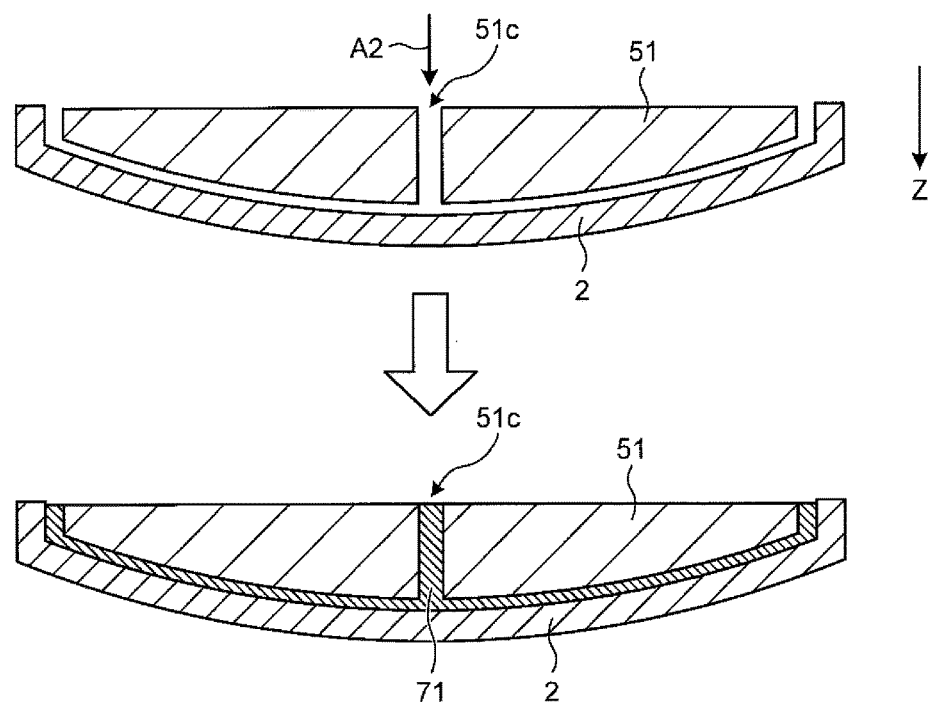
FIG. 21 is a diagram illustrating an example of a technique of joining curved surfaces facing each other.

To deal with this problem, as illustrated in FIG. 21, it is desirable that a technique is adopted in which an inflow hole 51*c* is formed that is opened at a part of the solid frame 51, and the OCR 71 is poured from the upper part of the inflow hole 51*c* as indicated by an arrow A2. Thus, because whole of the air is released from the peripheral part of the solid frame 51, occurrence of the air bubble 101 between the cover member 2 and the solid frame 51 can be prevented. It is desirable that the inflow hole 51*c* is formed, for example, at the position where the width in the width direction (Z-axis direction) of the solid frame 51 becomes the maximum. Also, a technique may be adopted in which the OCR 71 is poured by pressure from the lower part of the inflow hole 51*c* in a state where the state illustrated in FIG. 21 is reversed upside down.

In a case where joining curved surfaces facing each other, if the OCR is used, because the OCR 71 is liquid, it is sometimes difficult that joining curved surfaces precisely with the interval between them being constant.

Figure 22:
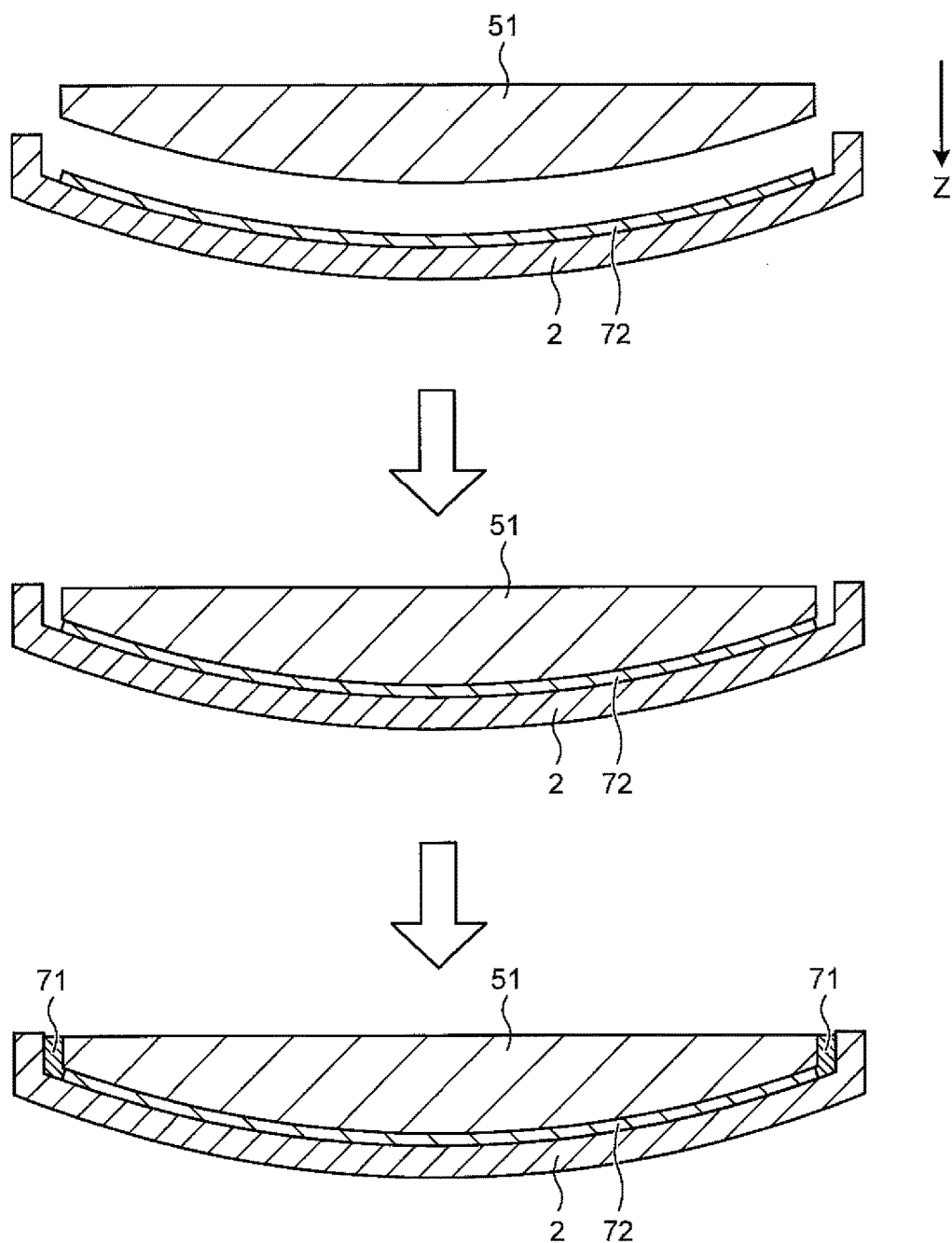
FIG. 22 is a diagram illustrating an example of a technique of joining curved surfaces facing each other.

To deal with this problem, as illustrated in FIG. 22, it is desirable that a technique is adopted in which an OCA 72, not the OCR71, is used on a part where the curved surfaces face each other, and the OCR71 is used on a part that cannot be joined by the OCA 72. In this way, curved surfaces can be joined to each other precisely with the interval between them being constant by using the OCA 72 at the part where the curved surfaces face each other.

5. Forth Embodiment

5-1. Basic Configuration of Image Display Apparatus

Next, the forth embodiment will be explained. Because main configuration of the image display apparatus 1 according to the forth embodiment is substantially the same as that of the first embodiment, difference from the first embodiment will be mainly explained hereinafter.

Figure 23:
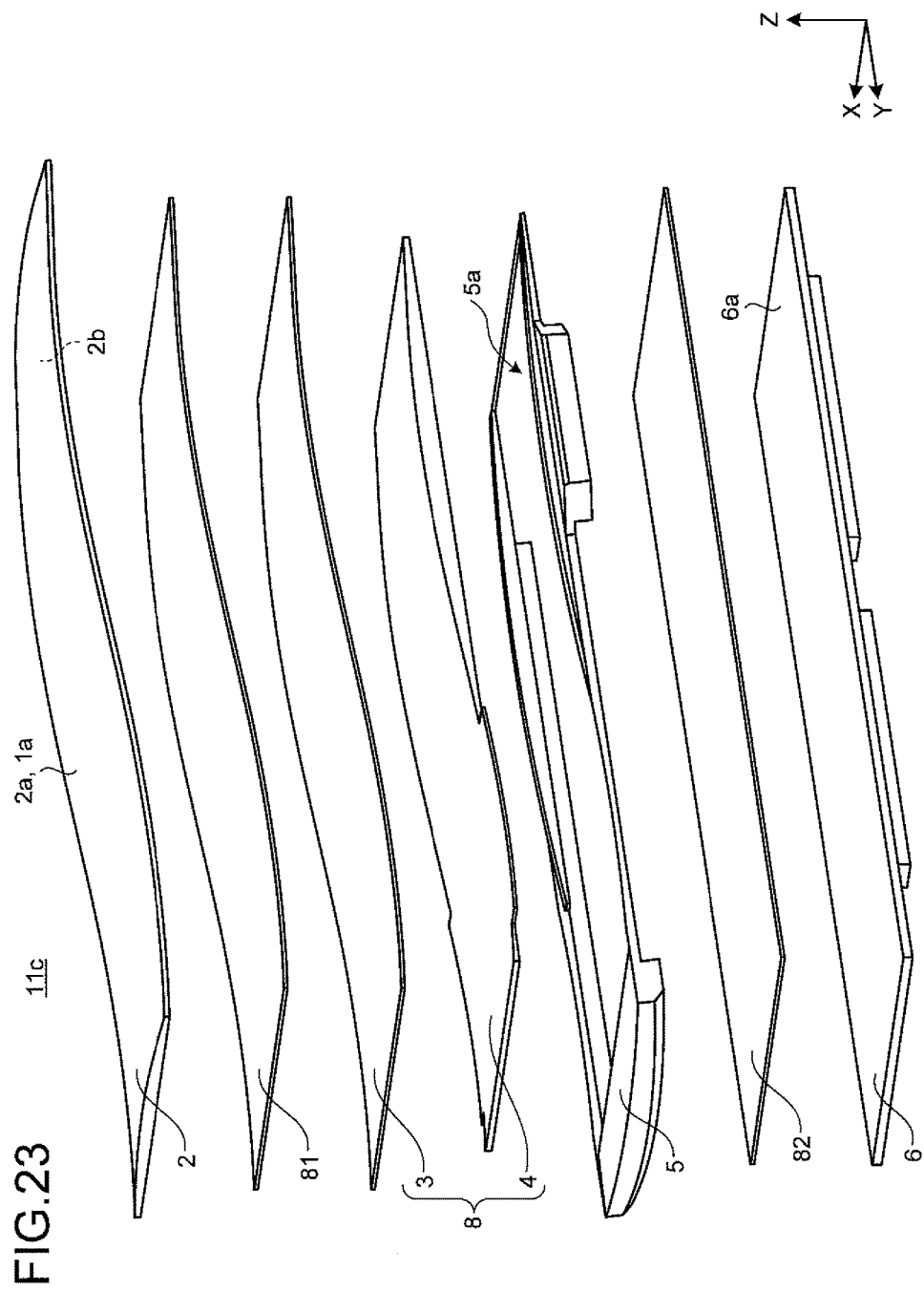
FIG. 23 is an exploded perspective view illustrating a configuration of a display module according to a fourth embodiment.
Figure 24:
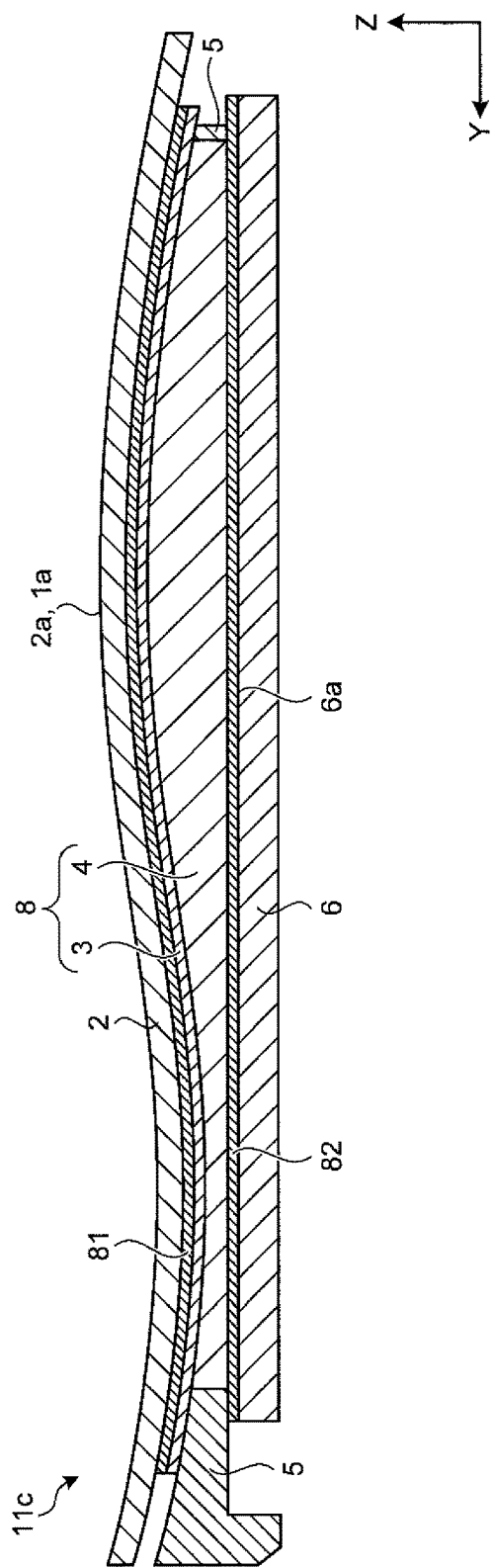
FIG. 24 is a cross-sectional view illustrating the display module according to the forth embodiment.

FIG. 23 is an exploded perspective view illustrating a configuration of a display module 11c. FIG. 24 is a cross-sectional view illustrating the display module 11c. In FIG. 24, to facilitate understanding of the configuration of the display module 11c, width in the depth direction (Z-axis direction) is emphasized more than actual width. And the explanation about components that are the same as those illustrated in FIG. 3 will be omitted by being followed by the same signs as those illustrated in FIG. 3.

As illustrated in FIGS. 23 and 24, the display module 11c differs from the first embodiment in that the display module 11c includes a first polarizing member 81 between the touch sensor 3 and the cover member 2, and a second polarizing member 82 between the display 6 and the clear resin body 4.

The first polarizing member 81 is a flexible optical filter made by, for example, absorbing and aligning iodine compound molecules, dye, or the like on polyvinyl alcohol to align molecular directions of the iodine compound molecules, the dye, or the like. The first polarizing member 81 selectively transmits light that is within a predetermined range of the polarization direction. The first polarizing member 81 is placed along the second principal surface 2b in back (negative Z side) of the cover member 2 in a state where the first polarizing member 81 is curved into the two-dimensional curved surface.

Figure 25:
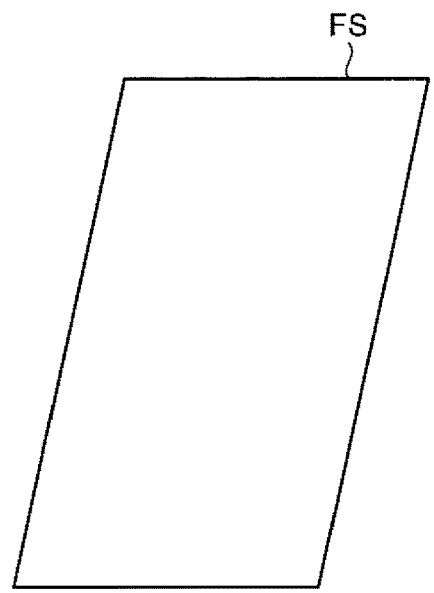
FIG. 25 is a diagram illustrating a shape of a first polarizing member.
Figure 26:
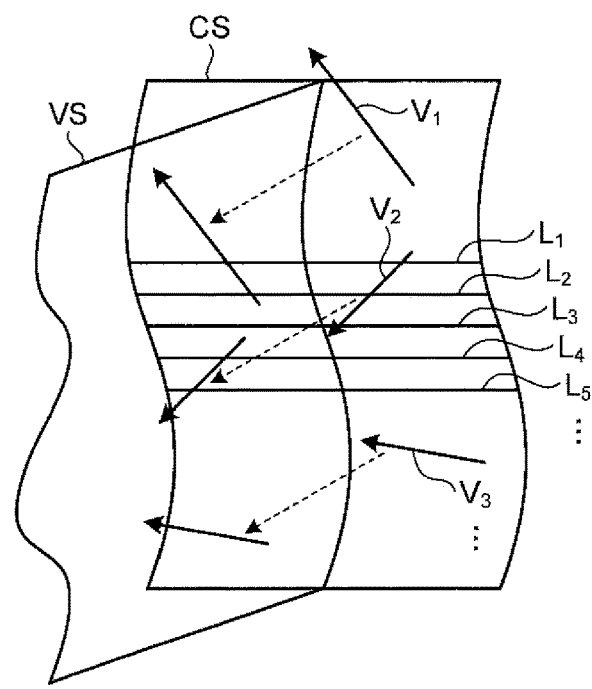
FIG. 26 is a diagram illustrating a shape of the first polarizing member.
Figure 27:
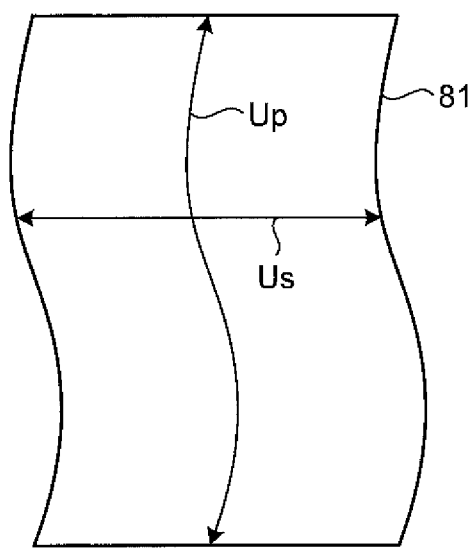
FIG. 27 is a diagram illustrating a shape of the first polarizing member.

Now, with reference to the FIGS. 25 to 27, the shape of the first polarizing member 81 will be explained. FIGS. 25 to 27 are diagrams illustrating the shape of the first polarizing member 81. The two-dimensional curved surface formed by the first polarizing member 81 is a curved surface CS illustrated in FIG. 26 that can be shaped by curving a planar sheet FS illustrated in FIG. 25. And the two-dimensional curved surface is the curved surface CS on which a direction of a vertical vector Vi (for example, such as $V_1$, $V_2$, $V_3$ illustrated in FIG. 26) at an arbitrary point becomes a direction W that extends in one planar surface (referred to as "vector surface VS" hereinafter).

Therefore, the curved surface is formed by a set of a straight line Li (for example, such as $L_1$, $L_2$, $L_3$, $L_4$, $L_5$ illustrated in FIG. 26) that extends in a direction vertical to the vector surface VS from the intersection between the vector surface VS and the curved surface CS.

As illustrated in FIG. 27, it is desirable that the first polarizing member 81 is the curved surface CS that is curved so that the polarization direction of the first polarizing member 81 is vertical (Us) or parallel (Up) to the vector surface VS. This is because, in the state, the extending direction of the first polarizing member 81 by curving (from plane sheet) becomes parallel or vertical to the polarization direction, and occurrence of distortion in a polarization direction U by extension of the sheet is restrained. Such a configuration may be preferably adopted in embodiments that will be described below.

Return to FIGS. 23 and 24, the second polarizing member 82, similarly to the first polarizing member 81, is a flexible optical filter made by, for example, absorbing and aligning iodine compound molecules, dye, or the like on polyvinyl alcohol to align molecular directions of the iodine compound molecules, the dye, or the like.

In other words, the second polarizing member 82 is an optical filter whose polarization direction is the same as that of the first polarizing member 81, and selectively transmits light whose polarization direction is the same (within predetermined range of polarization direction) as that of the light penetrates the first polarizing member 81. The front and back surfaces of the second polarizing member 82 is planar, and as illustrated in FIG. 24, the second polarizing member 82 is arranged between the clear resin body 4 and the display 6 with a state that the front surface of the second polarizing member 82 joins to the back surface of the clear resin body 4 and the back surface of the second polarizing member 82 joins to the front surface of the display 6.

In this way, the display module 11c includes a light-transmitting layer 8 between the first polarizing member 81 and the second polarizing member 82. The light-transmitting layer 8 is formed of material different from that of the first polarizing member 81, and includes the touch sensor 3 and the clear resin body 4 both of which transmit light of an arbitrary polarization direction.

In other words, the display module 11c has a configuration in which the second polarizing member 82, the light-transmitting layer 8 (clear resin body 4 and touch sensor 3), and the first polarizing member 81 are successively laminated on or above the light receiving side of the display 6.

Figure 28:
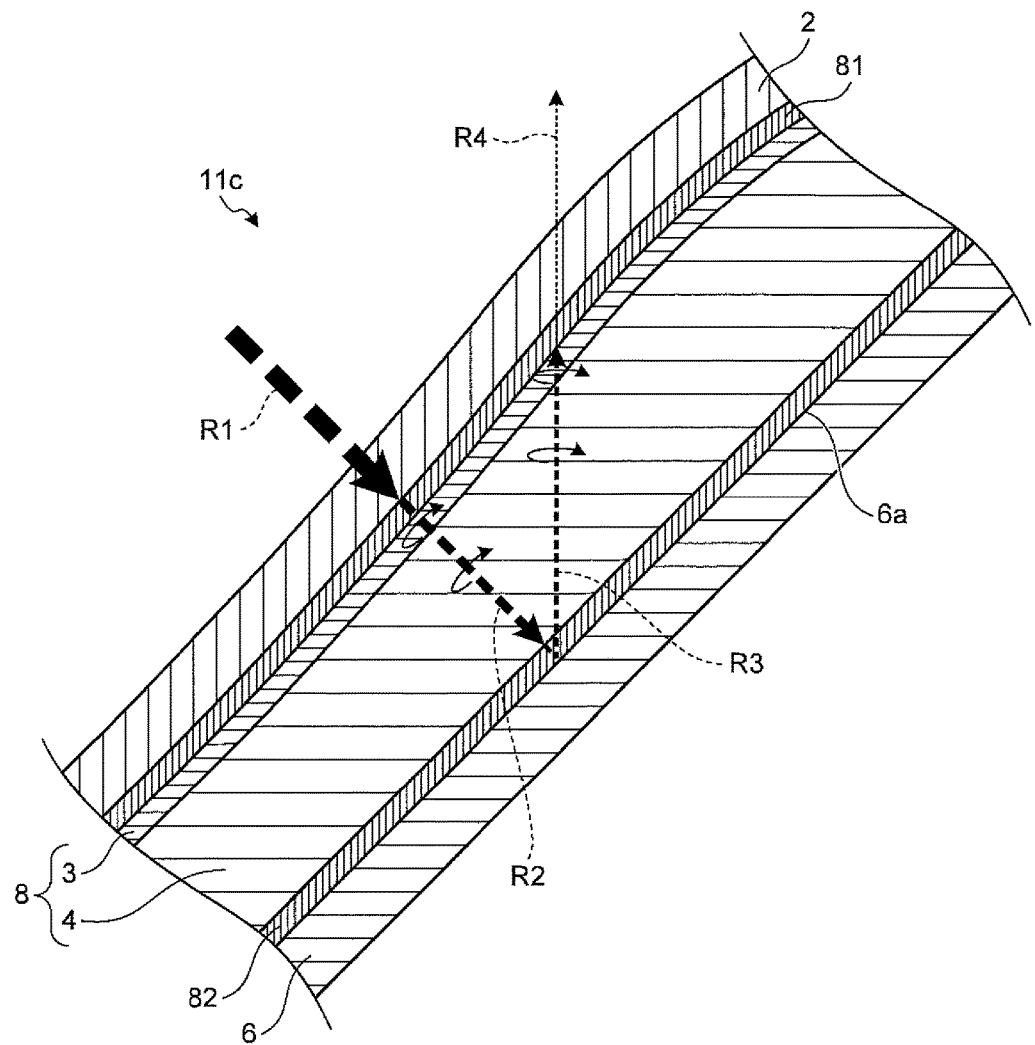
FIG. 28 is an enlarged cross-sectional view illustrating a part of the display module according to the fourth embodiment.

By such a configuration, the display module 11c improves the beautiful appearance when images are not displayed, and restrains an increase in power consumption when images are displayed. With reference to FIG. 28, this matter will be explained more specifically hereinafter.

5-2. Action and Effects by Display Module 11c

FIG. 28 is an enlarged cross-sectional view illustrating a part of the display module 11c according to the forth embodiment. In FIG. 28, light that is incident on the display module 11c and emits to the outside reflected from the display surface 6a of the display 6, is illustrated by a dotted line arrow. The intensity of the light is larger as the thickness of the dotted line arrow is larger.

As illustrated in FIG. 28, the image display apparatus 1 has a configuration in which the second polarizing member 82, the light-transmitting layer 8 (clear resin body 4 and touch sensor 3), and the first polarizing member 81 are successively laminated on or avobe the display surface 6a of the display 6.

When the display 6 is a liquid crystal display apparatus, because a polarizing member is included in front of the display 6, the polarizing member can also double as the second polarizing member 82. In this case, a polarization direction of the polarizing member of the liquid crystal display apparatus is to become the same as that of the first polarizing member 81. On the front surface of the first polarizing member 81, the cover member 2 is placed that has a curved surface being continuous with a crooked surface to which the image display apparatus 1 is attached in the interior of a vehicle.

Because light R1 that is incident on the cover member 2 of the image display apparatus 1 from the outside includes light of the various polarization directions, as illustrated in FIG. 28, the intensity of the light R1 is comparatively large. The light R1 penetrates the cover member 2 and is incident on the first polarizing member 81. As mentioned above, the first polarizing member 81 selectively transmits the light that is within the predetermined range of the polarization direction.

Therefore, the first polarizing member 81 can reduce the intensity of transmitting light R2 by removing light that is out of the predetermined range of the polarization direction from the incident light R1. The light R2 having passed through the first polarizing member 81 is incident on the touch sensor 3.

The touch sensor 3 is formed of material different from that of the first polarizing member 81. Therefore, the polarization direction of the light R2 is twisted when the light R2 having passed through the first polarizing member 81 is incident on the touch sensor 3. On the contrary, because no change occurs in the advance direction of the light R2, the light R2 penetrates the touch sensor 3 and is incident on the clear resin body 4 in a state where the polarization direction is twisted.

Also, the clear resin body 4 is formed of material different from that of the touch sensor 3. Therefore, the polarization direction of the light R2 is further twisted when the light R2 having passed through the touch sensor 3 is incident on the clear resin body 4. Here again, because no change occurs in the advance direction of the light R2, the light R2 is incident on the second polarizing member 82 in a state where the polarization direction is further twisted.

Now, the polarization direction of the second polarizing member 82 is the same as that of the first polarizing member 81. In other words, the second polarizing member 82 selectively transmits the light whose polarization direction is the same as that of the light the first polarizing member 81 selectively transmits.

The light R2 incident on the second polarizing member 82 has a twist in the polarization direction in the course of passing through the touch sensor 3 and the clear resin body 4. Therefore, the light R2 that is incident on the second polarizing member 82 includes the light that is out of the predetermined range of the polarization direction within which the second polarizing member 82 selectively transmits light.

Therefore, by removing the light, from the incident light R2, which is out of the predetermined range of the polarization direction, the second polarizing member 82 can further reduce the intensity of light R3 to be transmitted. The light R3 having passed through the second polarizing member 82 is reflected from the display surface 6a of the display 6, and penetrates the clear resin body 4 and the touch sensor 3 again, and is incident on the first polarizing member 81.

The second polarizing member 82 is formed of material that is different from that of the clear resin body 4, and the clear resin body 4 is formed of material that is different from that of the touch sensor 3. Therefore, here again, the light R3 reflected from the display surface 6a of the display 6 causes a twist in the polarization direction when being incident on the clear resin body 4, and further causes a twist in the polarization direction when being incident on the touch sensor 3. Because no change occurs in the advance direction, the light R3 is incident on the first polarizing member 81 in a state where the polarization direction is further twisted.

Therefore, by removing light, from the incident light R3, which is out of the predetermined range of the polarization direction, the first polarizing member 81 can further reduce the intensity of transmitting light R4. The light R4 having passed through the first polarizing member 81 penetrates the cover member 2.

In this way, the display module 11c can reduce intensity of both the light that is incident on the cover member 2 from the outside and arrives at the display surface 6a of the display 6, and the light that is reflected from the display surface 6a of the display 6 and emits from the cover member 2.

Therefore, the display module 11c allows it to be difficult that the user of the image display apparatus 1 recognizes the shape (outline) of the display 6 when the light from the outside is incident on the display 6 in a non-display state.

As a result, because, in the non-display state, the display module 11c is integrated with the smoothly crooked panel surface 91a of the center console 91 and gives the user an illusion as if the display 6 did not exist therein, the beautiful appearance can be improved.

Moreover, because the cover member 2 of the display module 11c is a clear member, the cover member 2 can display images with high visibility without displaying images that are as bright as those displayed by a display apparatus including a smoke plate, and can also restrain an increase in power consumption.

In the present embodiment, in a case where the cover member 2 is the clear member is described as an example, but the cover member 2 may be a member that is not completely clear. For example, the cover member 2 may have a configuration in which, by placing the first polarizing member 81 and the second polarizing member 82 in the display module 11c, a framework or the like around the display 6 becomes inconspicuous when the images are not displayed, and the cover member 2 may be smoke-treated to such a degree that the visibility of the displayed images is secured without increasing the brightness of the display 6 when displaying the images.

Also by the cover member 2, in the aforementioned case of the non-display state, the effect of integration of the display module 11c and the panel surface 91a of the crooked center console 91 is achieved.

6. Fifth Embodiment

Figure 29:
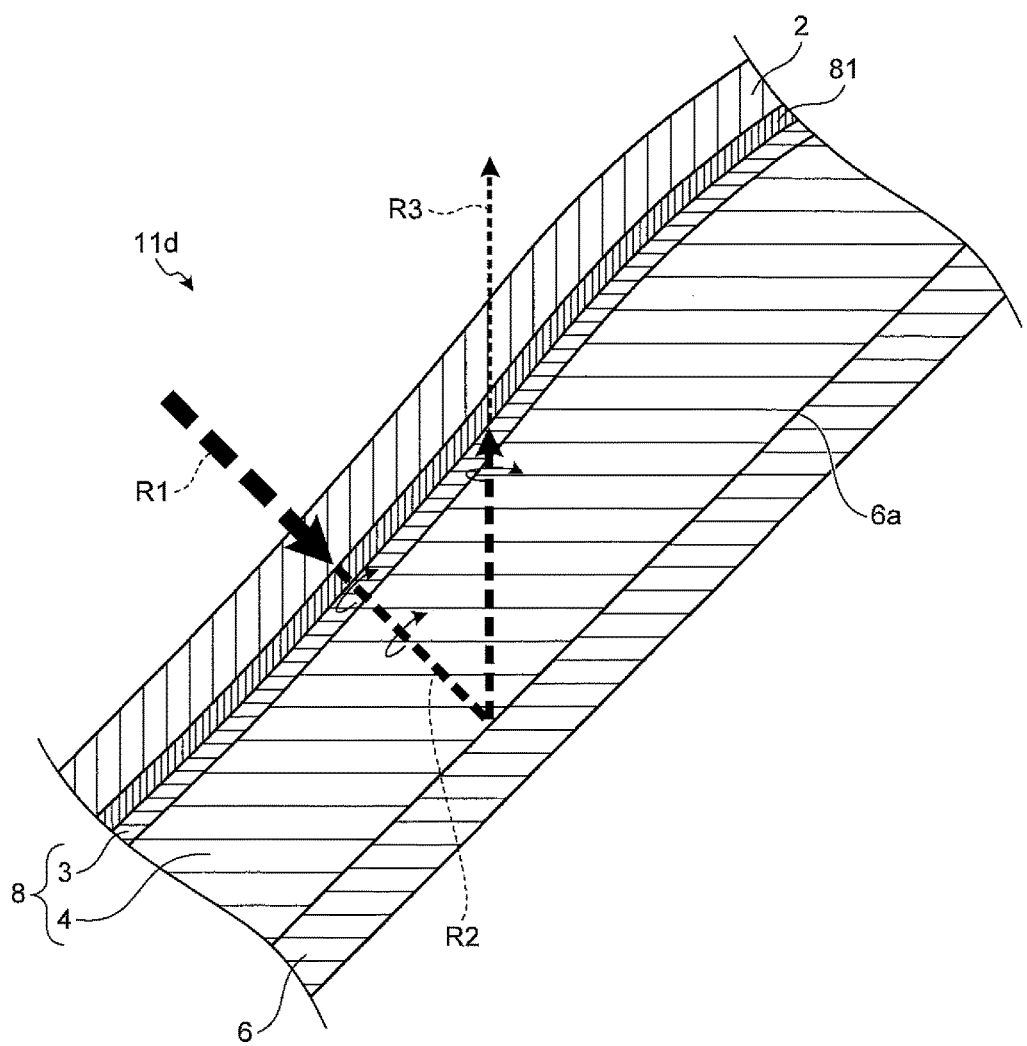
FIG. 29 is an enlarged cross-sectional view illustrating a part of a display module according to a fifth embodiment.

Next, the fifth embodiment will be explained. FIG. 29 is an enlarged cross-sectional view illustrating a part of a display module 11d according to the fifth embodiment. In components illustrated in FIG. 29, explanation about components that are the same as those illustrated in FIG. 28 will be omitted by being followed by the same signs as those illustrated in FIG. 28.

In FIG. 29, light that is incident on the display module 11d and reflected from the display surface 6a of the display 6 to emit to the outside is illustrated by a dotted line arrow. In FIG. 29, the light having the same reference sign as that illustrated in FIG. 28 has the same intensity as that of the light having the same reference sign as that illustrated in FIG. 28.

As illustrated in FIG. 29, the display module 11d has the same configuration as that of the display module 11c according to the forth embodiment except that the front surface of the display surface 6a of the display 6 attaches to the back surface of the clear resin body 4. In other words, although the display module 11d does not include the second polarizing member 82, the display module 11d is similar to the one illustrated in FIG. 28 in that the light-transmitting layer 8 (touch sensor 3 and clear resin body 4) is placed between the display 6 and the first polarizing member 81.

Also according to the display module 11d, it is possible to reduce intensity of both the light that is incident on the cover member 2 from the outside and arrives at the display surface 6a of the display 6, and the light that is reflected from the display surface 6a of the display 6 and emits from the cover member 2.

Specifically, in the display module 11d, as illustrated in FIG. 29, the light R1 having comparatively high intensity that includes light of various polarization directions penetrates the cover member 2 and is incident on the first polarizing member 81.

By removing the light, from the incident light R1, which is out of the predetermined range of the polarization direction, the first polarizing member 81 reduces the intensity of the light R2 to be transmitted. The light R2 having passed through the first polarizing member 81 is incident on the touch sensor 3.

The polarization direction of the light R2 having passed through the first polarizing member 81 is twisted when the light R2 is incident on the touch sensor 3, and then the light R2 penetrates the touch sensor 3 and is incident on the clear resin body 4. The polarization direction of the light R2 having passed through the touch sensor 3 is further twisted when the light R2 is incident on the clear resin body 4, and then the light R2 penetrates the clear resin body 4.

The light R2 having passed through the clear resin body 4 is reflected from the display surface 6a of the display 6, penetrates the clear resin body 4 and the touch sensor 3 again, and is incident on the first polarizing member 81.

Here again, the polarization direction of the light R2 reflected from the display surface 6a of the display 6 is twisted when the light R2 is incident on the clear resin body 4, and is further twisted when the light R2 is incident on the touch sensor 3. And the light R2 is incident on the first polarizing member 81 in a state where the polarization direction is further twisted.

By removing light, from the incident light R2, which is out of the predetermined range of the polarization direction, the first polarizing member 81 can further reduce the intensity of the transmitting light R3. The light R3 having passed through the first polarizing member 81 penetrates the cover member 2.

As mentioned above, the display module 11d according to the present embodiment includes the display 6, the light-transmitting layer 8, and the first polarizing member 81. The display 6 displays images, the light-transmitting layer 8 is laminated on or above the display surface 6a of the display 6, and the first polarizing member 81 is laminated over the display 6 while placing the light-transmitting layer 8 therebetween. Moreover, the light-transmitting layer 8 includes the touch sensor 3 having light transmissivity that detects the touch operation, and the clear resin body 4 that is a light transmitting plate arranged between the display 6 and the touch sensor 3.

Thus, the display module 11d can reduce intensity of both the light that is incident on the cover member 2 from the outside and arrives at the display surface 6a of the display 6, and the light that is reflected from the display surface 6a of the display 6 and emits from the cover member 2.

As a result, the display module 11d improves the beautiful appearance when images are not displayed, and can restrain an increase in power consumption when images are displayed. Moreover, because the second polarizing member 82 need not be included in the display module 11d, it becomes possible to simplify a manufacturing process and further reduce the manufacturing cost.

7. Sixth Embodiment

Figure 30:
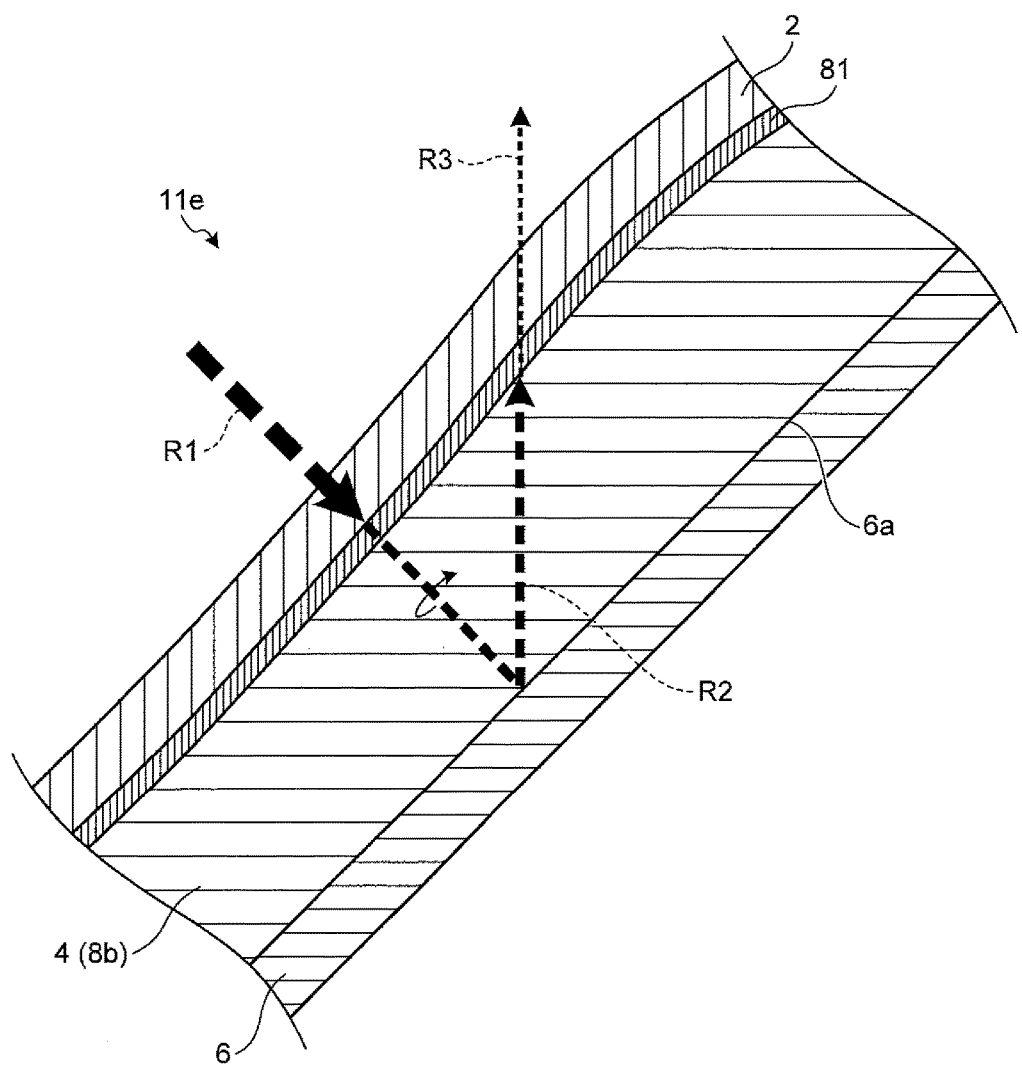
FIG. 30 is an enlarged cross-sectional view illustrating a part of a display module according to a sixth embodiment.

Next, the sixth embodiment will be explained. FIG. 30 is an enlarged cross-sectional view illustrating a part of a display module 11e according to the sixth embodiment. In components illustrated in FIG. 30, explanation about components that are the same as those illustrated in FIG. 29 will be omitted by being followed by the same signs as those illustrated in FIG. 29.

In FIG. 30, light that is incident on the display module 11e and emits to the outside reflected from the display surface 6a of the display 6 is illustrated by a dotted line arrow. Intensity of light illustrated in FIG. 30 having the same reference sign as that illustrated in FIG. 29 is the same as that of the light illustrated in FIG. 29 having the same reference sign.

As illustrated in FIG. 30, the display module 11e has the same configuration as that of the display module 11d illustrated in FIG. 29 except that the display module 11e does not include the touch sensor 3. The display module 11e is provided on an image display apparatus of a type where the operation thereof is controlled by a separately provided switch.

Also according to the display module 11e, it is possible to reduce intensity of both the light that is incident on the cover member 2 from the outside and arrives at the display surface 6a of the display 6, and the light that is reflected from the display surface 6a of the display 6 and emits from the cover member 2.

Specifically, in the display module 11e, as illustrated in FIG. 30, the light R1 having comparatively high intensity that includes the light of various polarization directions penetrates the cover member 2 and is incident on the first polarizing member 81. In the display module 11e, the clear resin body 4 corresponds to a light-transmitting layer 8b.

By removing light, from the incident light R1, that is out of the predetermined range of the polarization direction, the first polarizing member 81 can reduce the intensity of the transmitting light R2. The light R2 having passed through the first polarizing member 81 is incident on the clear resin body 4.

The polarization direction of the light R2 having passed through the first polarizing member 81 is twisted when the light R2 is incident on the clear resin body 4, and then the light R2 penetrates the clear resin body 4 and is reflected from the display surface 6a of the display 6. Then, the light R2 reflected from the display surface 6a of the display 6 penetrates the clear resin body 4 again and is incident on the first polarizing member 81.

Here again, the polarization direction of the light R2 reflected from the display surface 6a of the display 6 is twisted when the light R2 is incident on the clear resin body 4, and the light R2 is incident on the first polarizing member 81 in a state where the polarization direction is twisted.

Therefore, by removing light, from the incident light R2, which is out of the predetermined range of the polarization direction, the first polarizing member 81 can further reduce the intensity of the transmitting light R3. The light R3 having passed through the first polarizing member 81 penetrates the cover member 2.

As mentioned above, the display module 11e according to the present embodiment includes the display 6 that displays images, the light-transmitting layer 8b (clear resin body 4) laminated on the display surface 6a of the display 6, and the first polarizing member 81 that is laminated over the display 6 while placing the light-transmitting layer 8b therebetween.

Thus, the display module 11e can reduce intensity of both the light that is incident on the cover member 2 from the outside and arrives at the display surface 6a of the display 6, and the light that is reflected from the display surface 6a of the display 6 and emits from the cover member 2.

As a result, the display module 11e improves the beautiful appearance when images are not displayed, and can restrain an increase in power consumption when images are displayed. Moreover, because the second polarizing member 82 and the touch sensor 3 need not be included in the display module 11e, it becomes possible to simplify a manufacturing process and further reduce the manufacturing cost.

8. Seventh Embodiment

Figure 31:
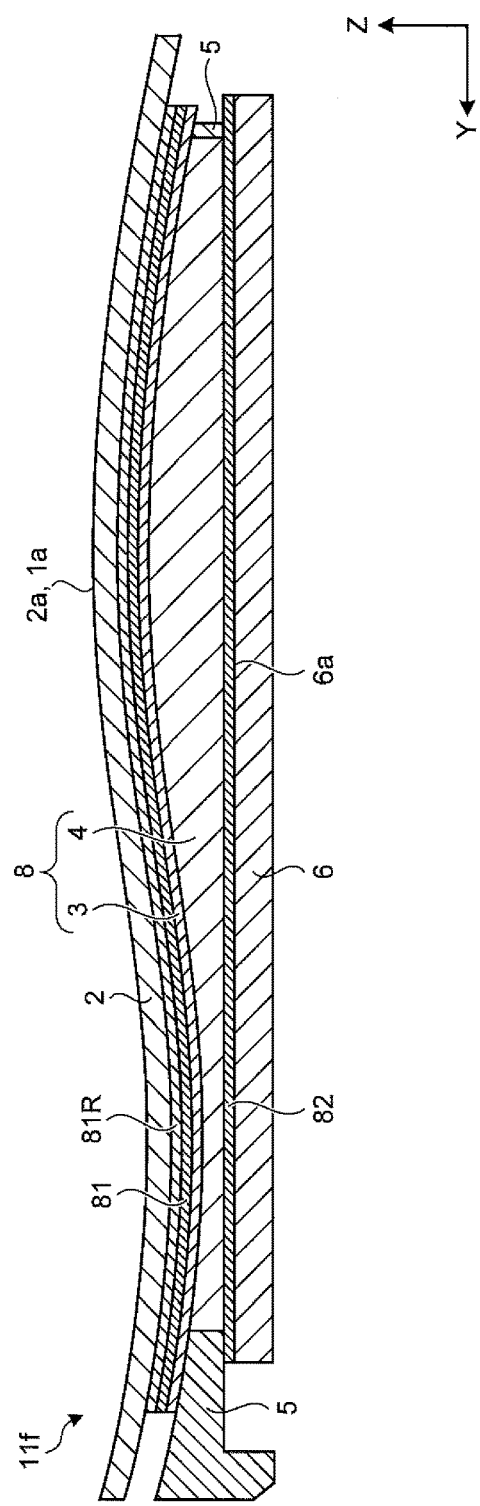
FIG. 31 is a cross-sectional view illustrating a display module according to a seventh embodiment.
Figure 32:
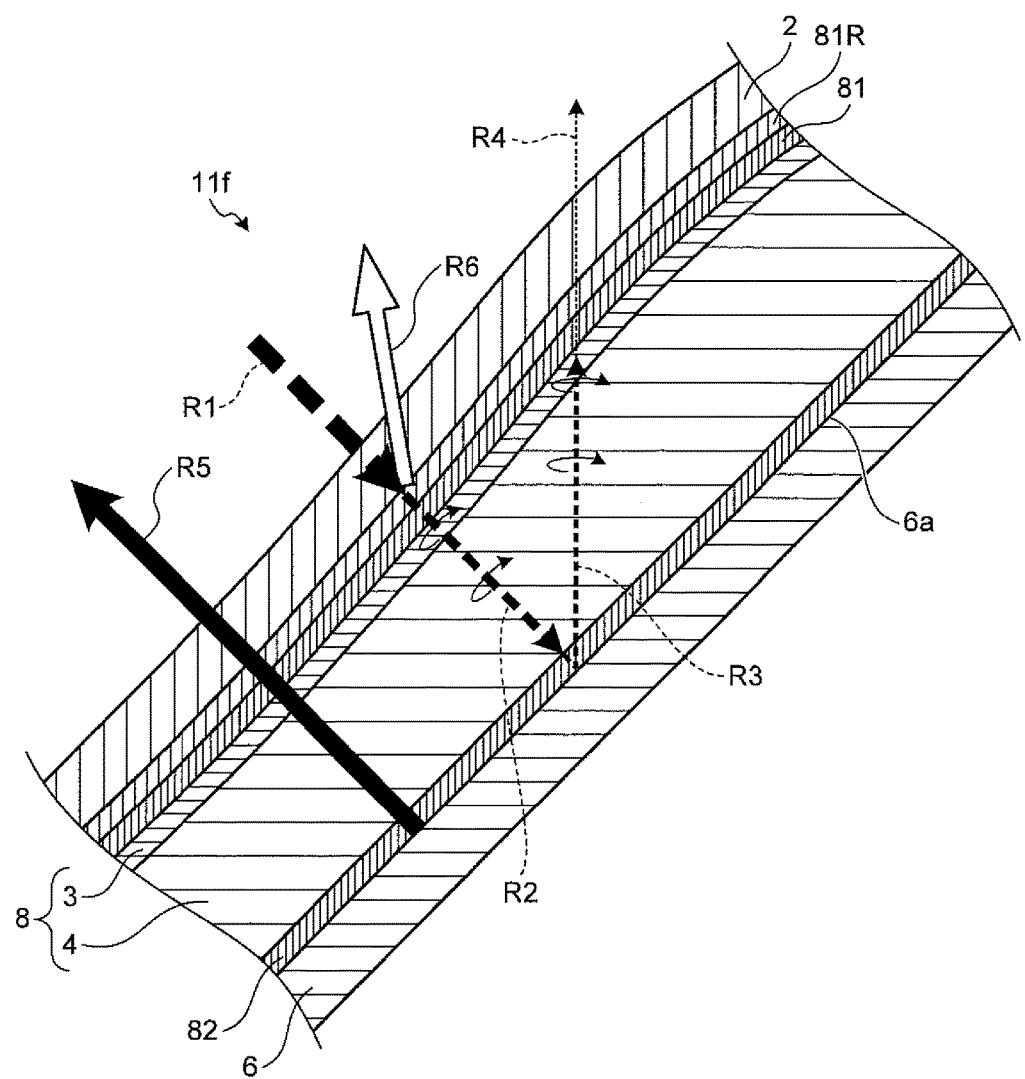
FIG. 32 is an enlarged cross-sectional view illustrating a part of the display module according to the seventh embodiment.
Figure 33:
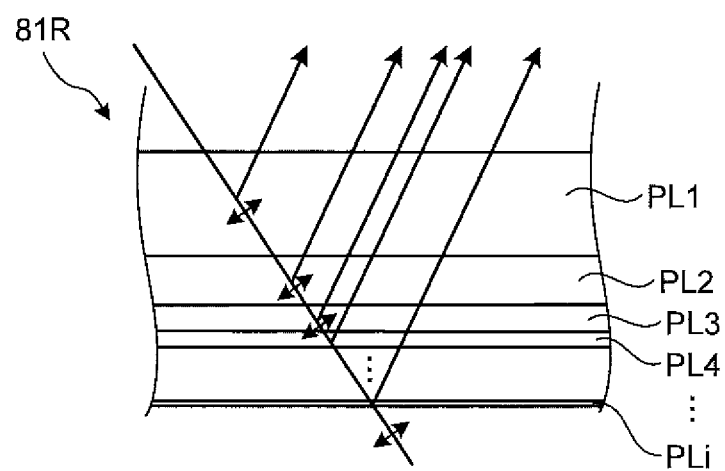
FIG. 33 is an enlarged cross-sectional view illustrating a part of a reflective polarizing plate according to the seventh embodiment.

Next, the seventh embodiment will be explained. FIG. 31 is a cross-sectional view illustrating a display module 11f according to the seventh embodiment. FIG. 32 is an enlarged cross-sectional view illustrating a part of the display module 11*f* according to the seventh embodiment. FIG. 33 is an enlarged cross-sectional view illustrating a part of a reflective polarizing plate 81R according to the seventh embodiment.

In components illustrated in FIGS. 31 and 32, explanation about components that are the same as those illustrated in FIGS. 24 and 28 will be omitted by being followed by the same signs as those illustrated in FIG. 24 or 28.

In FIG. 32, light that is incident on the display module 11*f* and emits to the outside reflected from the display surface 6*a* of the display 6 is illustrated by a dotted line arrow.

As illustrated in FIG. 31, the display module 11*f* has a configuration in which the reflective polarizing plate 81R is arranged between the first polarizing member 81 that is a linearly polarizing plate and the cover member 2 in the display module 11*c* illustrated in FIG. 24. When the display 6 displays (puts light on) images of some characters, figures, or the like, the images are displayed on the display module 11*f* to function as a display device.

Also in the display module 11*f*, when the display 6 does not display anything (puts light out), the display module 11*f* functions as a mirror (in a state where intensity of reflected light of incident light from the outside is larger than that of emission light from the inside).

The reflective polarizing plate 81R has a configuration in which polyester sheets (PL1, PL2, PL3, PL4, . . . , PLi) having different thickness are laminated and extended as illustrated in FIG. 33, for example. In each of the polyester sheets (PL1, PL2, PL3, PL4, . . . PLi), the transmittance of polarization components in some direction of incident light is large, on the contrary, the reflectance of polarization components in the other directions is large in a specified wavelength band whose parameter includes sheet thickness. As a result, as a whole of the reflective polarizing plate 81R, the transmittance of light is large in the specified polarization components and the reflectance is large in the other components.

In the display module 11*f* illustrated in FIG. 32, the reflective polarizing plate 81R is arranged so that a polarization direction of penetrating the reflective polarizing plate 81R becomes the same as those of the first polarizing member 81 and the second polarizing member 82. Thus, when the display 6 displays something, because, in the emission light from the display 6, light R5 of a polarization component that penetrates the second polarizing member 82, the first polarizing member 81, and the reflective polarizing plate 81R is transmitted, the display 6 can be visibly recognized.

The first polarizing member 81 prevents reflection at the reflective polarizing plate 81R of turbulent components of the polarized light, which is caused by turbulence of the polarized light when the polarized light from the second polarizing member 82 penetrates the touch sensor 3 and the clear resin body 4. And the first polarizing member 81 is for improvement of quality of display (regardless of the on/off state of the light) by preventing emission of the light that multiply reflected inside the display module 11*f*.

When the display 6 is put out, because the emission light from the display module 11*f* becomes substantially only reflected light R6 that is from the outside and reflected from the reflective polarizing plate 81R, the display module 11*f* becomes to function as a mirror.

To maintain display quality under display, the intensity of the emission light from the display 6 need to be properly adjusted considering the reflected light that is from the outside and reflected from the reflective polarizing plate 81R.

According to the configuration (arrangement of first polarizing member 81 and second polarizing member 82), similarly to the embodiment illustrated in FIG. 28, an effect (improvement of beautiful appearance in non-display state) by the first polarizing member 81 and the second polarizing member 82 is also produced.

As mentioned above, the display module 11*f* according to the present embodiment can improve the beautiful appearance when images are not displayed, and can restrain an increase in power consumption when images are displayed, and further can be used as a mirror. Thus, the display module 11*f* according to the present embodiment may be suitable for a multifunctional display apparatus (for example, such as rearview mirror with display function) of an automobile, for example.

9. Modifications

As mentioned above, the embodiments according to the present invention has been explained, however the present invention is not limited to the embodiments mentioned above and various modifications are possible. Hereinafter, such modifications will be explained. Each of the embodiments included in the aforementioned embodiments and embodiments that will be explained hereinafter is possible to be combined appropriately with each other.

In the aforementioned first to seventh embodiments, the film-shaped touch sensor 3 is explained to be curved into the two-dimensional curved surface. On the other hand, a touch sensor may be adopted that is shaped into the three-dimensional curved surface whose shape is the same as that of the first principal surface (operation surface) of the cover member. In this case, it is possible that the first principal surface and the second principal surface of the cover member can be made to be the same shape. Also, the second principal surface of the cover member is shaped into the three-dimensional curved surface, and the touch sensor may be formed directly on the second principal surface.

In the aforementioned first to seventh embodiments, the shape of the second principal surface 2*b* of the cover member 2 is shaped into the two-dimensional curved surface that is substantially the same as that of the first principal surface 2*a* in one direction. On the contrary, the shape of the second principal surface of the cover member may be the two-dimensional curved surface that has no relation to the shape of the first principal surface. Also in this way, the touch sensor can be placed along the shape of the second principal surface of the cover member.

In the aforementioned embodiments, the display module 11, 11*a*, 11*b*, 11*c*, 11*d*, and 11*f* includes the touch sensor 3 respectively. However, a configuration in which the touch sensor 3 is not included may be adopted. Also in this case, an airless layer is totally formed between the first principal surface of the cover member and the display surface, and an air layer between them is excluded. Thus, because an image displayed on the display surface 6*a* seems to float up toward the first principal surface and the reflected light is restrained, visibility of the image can be improved.

In the aforementioned embodiments, the image display apparatus 1 is explained to be an on-vehicle apparatus that is mounted on a vehicle such as an automobile. However, the image display apparatus 1 may be a display apparatus that is used at other places such as home, store, office, and factory. The image display apparatus 1 may be a portable display apparatus such as a smartphone and a tablet terminal.

REFERENCE SIGNS LIST

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An image display apparatus that accepts a touch operation, comprising:
   a display that includes a planar display surface on which an image is displayed;
   a cover member that includes a curved first principal surface, the first principal surface being arranged to overlap with the display surface of the display and being a target for the touch operation;
   a transmission body that fills a space between the cover member and the display so that the space is not hollow: and
   a touch sensor that is arranged between the cover member and the display, the touch sensor detecting the touch operation with respect to the first principal surface of the cover member,
   wherein the first principal surface of the cover member is a curved surface that is curved in two or more directions that are mutually different,
   wherein a second principal surface opposite to the first principal surface of the cover member is a curved surface that is curved in only one direction, and
   wherein the touch sensor is placed along the second principal surface.

2. The image display apparatus according to claim 1, wherein a shape of the second principal surface of the cover member is substantially a same as that of the first principal surface in the one direction.

3. The image display apparatus according to claim 1, further comprising one polarizing member that is arranged between the touch sensor and the cover member.

4. The image display apparatus according to claim 3, further comprising another polarizing member that is arranged between the display and the transmission body and whose polarization direction is a same as that of the one polarizing member.

5. The image display apparatus according to claim 3 wherein the polarizing member is a reflective polarizing member.

6. The image display apparatus according to claim 3, further comprising a reflective polarizing member that is laminated over the display while placing the polarizing member therebetween.

7. The image display apparatus according to claim 1, wherein the first principal surface of the cover member has a curved shape in which the first principal surface is continuous with a crooked surface on which the image display apparatus is mounted in an interior of a vehicle.

* * * * *